US010068417B2

(12) United States Patent
Toohey et al.

(10) Patent No.: US 10,068,417 B2
(45) Date of Patent: Sep. 4, 2018

(54) MOBILE SECONDARY BETTING USER INTERFACE

(71) Applicant: Bally Gaming, Inc., Las Vegas, NV (US)

(72) Inventors: John Toohey, Boca Raton, FL (US); Anthony J. Baerlocher, Henderson, NV (US); Dale R. Buchholz, Palatine, IL (US); James S. Peterson, Batavia, IL (US); Craig J. Sylla, Round Lake, IL (US); Matthew J. Ward, Northbrook, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 140 days.

(21) Appl. No.: 14/821,196

(22) Filed: Aug. 7, 2015

(65) Prior Publication Data

US 2016/0042599 A1 Feb. 11, 2016

Related U.S. Application Data

(60) Provisional application No. 62/034,646, filed on Aug. 7, 2014.

(51) Int. Cl.

| | |
|---|---|
| ***G06F 17/00*** | (2006.01) |
| ***G07F 17/32*** | (2006.01) |
| *G07F 17/34* | (2006.01) |

(52) U.S. Cl.

CPC ...... *G07F 17/3225* (2013.01); *G07F 17/3241* (2013.01); *G07F 17/34* (2013.01)

(58) Field of Classification Search

USPC ..................................................... 463/16–25

See application file for complete search history.

(56) References Cited

U.S. PATENT DOCUMENTS

| | | |
|---|---|---|
| 5,259,613 A | 11/1993 | Marnell, II |
| 5,265,874 A | 11/1993 | Dickinson et al. |

(Continued)

FOREIGN PATENT DOCUMENTS

| | | |
|---|---|---|
| AU | 199534536 | 5/1998 |
| WO | 9712315 | 4/1997 |
| WO | 2007146346 | 12/2007 |

OTHER PUBLICATIONS

"Australian Patent Application No. 2015210435, Examination Report", dated Dec. 16, 2016, 4 pages.

(Continued)

*Primary Examiner* — Ronald Laneau

(74) *Attorney, Agent, or Firm* — David J. Bremer; Grant A. Dingledine

(57) ABSTRACT

A wagering game system and its operations are described herein. In some embodiments, the operations can include detecting a request to pair a mobile device with a secondary content controller that is communicatively coupled to a wagering game machine. In some examples the secondary content controller is independent of a primary content controller for the wagering game machine. The operations can further include determining, by the secondary content controller, that primary wagering game content of the wagering game machine is in a state that would permit secondary wagering on the primary wagering game content. Further, the operations can include pairing the mobile device with the secondary content controller after determining that the primary wagering game content is in the state that would permit the secondary wagering.

25 Claims, 14 Drawing Sheets

(56) References Cited

U.S. PATENT DOCUMENTS 5,326,104 A 7/1994 Pease et al.
5,342,047 A 8/1994 Heidel et al.
5,412,404 A 5/1995 Candy
5,450,938 A 9/1995 Rademacher
5,605,506 A 2/1997 Hoorn et al.
5,655,961 A 8/1997 Acres et al.
5,919,091 A 7/1999 Bell et al.
5,971,271 A 10/1999 Wynn et al.
6,146,276 A 11/2000 Okuniewics
6,280,328 B1 8/2001 Holch et al.
6,379,246 B1 4/2002 Dabrowski
6,676,522 B2 1/2004 Rowe et al.
6,800,029 B2 10/2004 Rowe et al.
6,846,238 B2 1/2005 Wells
7,025,674 B2 4/2006 Adams et al.
7,335,106 B2 2/2008 Johnson
7,390,263 B1 6/2008 Acres
7,611,409 B2 11/2009 Muir et al.
7,686,687 B2 3/2010 Cannon et al.
7,699,703 B2 4/2010 Muir et al.
7,749,081 B1 7/2010 Acres
7,780,517 B2 8/2010 Saffari et al.
7,850,528 B2 12/2010 Wells
7,867,092 B2 1/2011 Paulsen
7,867,095 B2 1/2011 Mattice et al.
7,892,090 B2 2/2011 Walker et al.
7,905,780 B2 3/2011 Morrow et al.
7,927,211 B2 4/2011 Rowe et al.
7,950,996 B2 5/2011 Nguyen et al.
7,950,999 B2 5/2011 Morrow et al.
7,951,003 B2 5/2011 Russell
8,007,361 B2 8/2011 Walker et al.
8,029,364 B2 10/2011 Loose et al.
8,070,590 B2 12/2011 Cannon et al.
8,083,592 B2 12/2011 Wells
8,088,009 B2 1/2012 Finnimore et al.
8,088,014 B2 1/2012 Wells
8,113,956 B2 2/2012 Finnimore et al.
8,133,102 B2 3/2012 Dabrowski
8,226,474 B2 7/2012 Nguyen et al.
8,241,119 B2 8/2012 Wells
8,241,123 B2 8/2012 Kelly et al.
8,241,124 B2 8/2012 Kelly et al.
8,241,127 B2 8/2012 Kovacs
8,267,792 B2 9/2012 Buchholz et al.
8,282,480 B2 10/2012 Wells et al.
8,282,490 B2 10/2012 Arezina et al.
8,317,604 B2 11/2012 Wells
8,323,111 B2 12/2012 Finnimore et al.
8,328,632 B2 12/2012 Cannon et al.
8,333,655 B2 12/2012 Gagner et al.
8,336,697 B2 12/2012 Wells
8,342,935 B1 1/2013 Morrow et al.
8,348,759 B2 1/2013 Dimichele et al.
8,371,937 B2 2/2013 Wells
8,371,942 B2 2/2013 Finnimore et al.
8,376,837 B2 2/2013 Gagner et al.
8,388,424 B2 3/2013 Dabrowski
8,419,526 B1 4/2013 Cannon et al.
8,430,741 B2 4/2013 Agarwal et al.
8,469,800 B2 6/2013 Lemay et al.
8,475,273 B2 7/2013 Kelly et al.
8,475,283 B2 7/2013 Guinn et al.
8,512,144 B2 8/2013 Johnson
8,529,345 B2 9/2013 Nguyen
8,550,900 B2 10/2013 Walker et al.
8,550,903 B2 10/2013 Lyons et al.
8,597,111 B2 12/2013 Lemay et al.
8,616,981 B1 12/2013 Guinn et al.
8,628,418 B2 1/2014 Abbot
8,678,916 B2 3/2014 Cannon et al.
8,784,206 B1 * 7/2014 Gronkowski ....... G07F 17/3206 463/32
8,858,323 B2 10/2014 Nguyen et al.
9,335,964 B2 * 5/2016 Khatod ................. G06F 3/1415
9,489,794 B2 * 11/2016 Hilbert ................ G07F 17/3211
9,734,666 B2 * 8/2017 Gagner ............... G07F 17/3244
2003/0054881 A1 3/2003 Hedrick et al.
2004/0142739 A1 7/2004 Loose et al.
2005/0020354 A1 1/2005 Nguyen et al.
2005/0020358 A1 1/2005 Cram
2005/0162337 A1 7/2005 Ohashi et al.
2005/0240873 A1 10/2005 Czerwinski et al.
2006/0143085 A1 6/2006 Adams et al.
2006/0252530 A1 11/2006 Oberberger et al.
2007/0021198 A1 1/2007 Muir et al.
2007/0105613 A1 5/2007 Adams et al.
2007/0111787 A1 5/2007 Adams et al.
2007/0243925 A1 10/2007 Lemay et al.
2007/0243934 A1 10/2007 Little
2008/0009344 A1 1/2008 Graham et al.
2008/0076572 A1 3/2008 Nguyen et al.
2008/0113802 A1 5/2008 Johnson et al.
2008/0113820 A1 5/2008 Tedsen et al.
2008/0161107 A1 7/2008 Johnson
2008/0234029 A1 9/2008 Cannon et al.
2008/0248865 A1 10/2008 Tedesco et al.
2008/0305862 A1 12/2008 Walker et al.
2009/0042634 A1 2/2009 Cannon et al.
2009/0098943 A1 4/2009 Weber et al.
2009/0104954 A1 4/2009 Weber et al.
2009/0233705 A1 9/2009 Lemay et al.
2010/0087241 A1 4/2010 Nguyen et al.
2010/0210352 A1 8/2010 Ansari et al.
2010/0210353 A1 8/2010 Gagner et al.
2011/0009188 A1 1/2011 Adiraju et al.
2011/0053672 A1 * 3/2011 Gagner ................... G07F 17/32 463/16
2011/0195792 A1 8/2011 Wells et al.
2011/0263325 A1 10/2011 Atkinson
2012/0077560 A1 3/2012 Cannon et al.
2012/0108338 A1 5/2012 Wells et al.
2012/0122558 A1 5/2012 Lyons et al.
2012/0122560 A1 5/2012 Loose et al.
2013/0017884 A1 1/2013 Price et al.
2013/0023339 A1 1/2013 Davis et al.
2013/0053136 A1 2/2013 Lemay et al.
2013/0053148 A1 2/2013 Nelson et al.
2013/0059648 A1 3/2013 Rowe et al.
2013/0072310 A1 3/2013 Wells
2013/0084963 A1 4/2013 Shorrock et al.
2013/0084972 A1 4/2013 Frady
2013/0084973 A1 4/2013 Frady
2013/0095904 A1 4/2013 Cannon et al.
2013/0130779 A1 5/2013 Gagner et al.
2013/0130782 A1 5/2013 Hornik et al.
2013/0130806 A1 5/2013 Gagner et al.
2013/0178271 A1 * 7/2013 Aponte ................... G07F 17/34 463/20
2013/0196755 A1 8/2013 Nelson et al.
2013/0231192 A1 9/2013 Walker et al.
2013/0252714 A1 9/2013 Buchholz et al.
2013/0260889 A1 10/2013 Lemay et al.
2013/0274016 A1 10/2013 Gagner et al.
2013/0337889 A1 12/2013 Gagner et al.
2013/0337890 A1 12/2013 Earley et al.
2014/0031107 A1 1/2014 Walker et al.
2014/0045582 A1 2/2014 Lyons et al.
2014/0094272 A1 4/2014 Kelly et al.
2014/0141864 A1 5/2014 Ward et al.
2014/0248941 A1 9/2014 Nelson et al.
2014/0287822 A1 9/2014 Young
2015/0302695 A1 10/2015 Ward et al.
2015/0348361 A1 * 12/2015 Adiraju ............... G07F 17/3213 463/20

OTHER PUBLICATIONS

Co-pending U.S. Appl. No. 14/684,950, filed Apr. 13, 2015, 57 pages.

* cited by examiner

MOBILE SECONDARY BETTING USER INTERFACE

RELATED APPLICATIONS

This application claims priority benefit of Provisional U.S. Application No. 62/034,646 filed Aug. 7, 2014. The 62/034,646 Application is incorporated herein by reference in its entirety.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2015, WMS Gaming, Inc.

TECHNICAL FIELD

Embodiments of the inventive subject matter relate generally to wagering game systems and networks that, more particularly, to providing secondary game content.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

In an effort to develop new games and gaming enhancements, one or more manufacturers have developed technology to present secondary content simultaneously with presentation of wagering games. While the secondary content can add to the entertainment value of a wagering game machine, it can also present certain challenges. For example, if a primary wagering game and the secondary content are controlled by separate sources, then coordination of content can be challenging.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
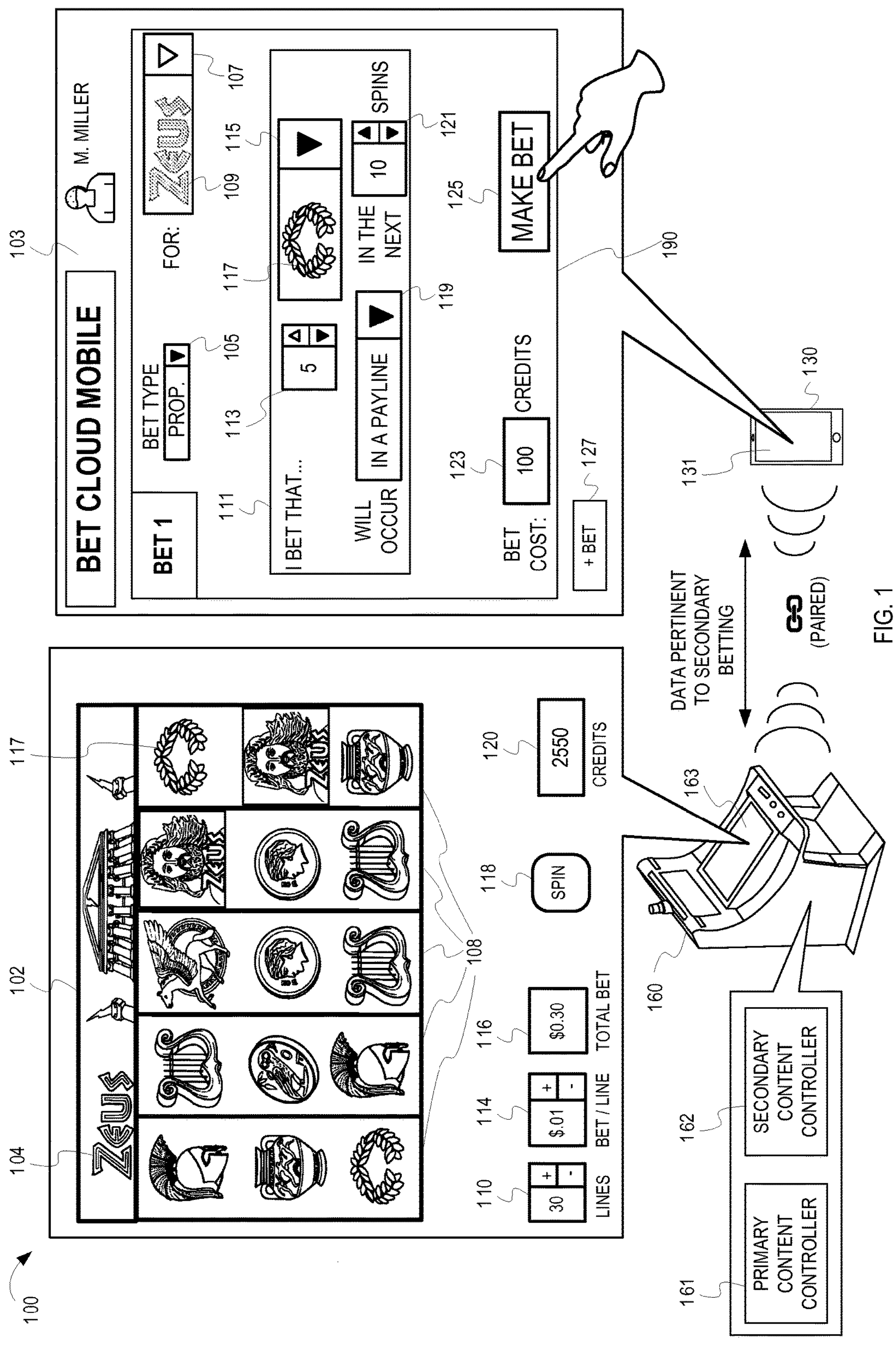
FIG. 1 is an illustration of transacting one or more secondary bets made by a mobile device paired with a wagering game machine, according to some embodiments.

This description of the embodiments is divided into five sections. The first section provides an introduction to embodiments. The second section describes example operations performed by some embodiments while the third section describes additional example embodiments. The fourth section describes example operating environments while the fifth section presents some general comments.

For purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or online casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Further, some embodiments of the inventive subject matter describe examples of providing secondary betting (also referred to as secondary wagering) via an associated mobile device in a network wagering venue (e.g., an online casino, a wagering game website, a wagering network, etc.) using a communication network. Embodiments can be presented over any type of communications network that provides access to wagering games, such as a public network (e.g., a public wide-area-network, such as the Internet), a private network (e.g., a private local-area-network gaming network), a peer-to-peer network, a social network, etc., or any combination of networks. Multiple users can be connected to the networks via computing devices. The multiple users can have accounts that utilize specific services, such as account-based wagering services (e.g., account-based wagering game websites, account-based casino networks, etc.).

Introduction

This section provides an introduction to some embodiments.

Wagering games are expanding in popularity. Wagering game enthusiasts expect continuous innovations to the wagering game experience. As such, wagering game companies are interested in creating and providing innovative wagering games and gaming features to the demanding public. As mentioned previously, some wagering game manufacturers have developed ways to present primary wagering game content and secondary content. Some embodiments of the inventive subject matter include providing secondary content via a mobile device. The secondary content provides a way to make one or more secondary bets (also referred to as secondary wagers) on the primary wagering game content. In some examples, the secondary content is independent from the primary wagering game content (e.g., the secondary content originates from and/or is controlled by a different content source, a different content provider, a different content manufacturer, etc. than that of the primary wagering game content).

In some examples, a secondary content controller is communicatively coupled to a wagering game machine. The secondary content controller can be independent of (e.g., function independently from) the wagering game machine. For example, the secondary content controller may not be native to the original manufacturing of the wagering game machine or may be an add-on to the wagering game machine. For instance, the secondary content controller can be inserted into an expansion slot of the wagering game machine. The secondary content controller includes wireless communication capabilities, such as a Bluetooth beacon. The secondary content controller can pair a mobile device to the wagering game machine. The secondary content controller can further determine appropriate times to pair the mobile device, such as only when the wagering game machine is being used (e.g., when a wagering game session ("gaming session") has been initiated, when the wagering game machine has been funded, etc.).

When paired, the mobile device can present content to make a secondary bet on the primary wagering game content. In some examples, the secondary content controller can determine when primary wagering game content on the wagering game machine is in a state that would permit secondary wagering. For example, the secondary content controller can determine whether the primary wagering game content is in a playing state that pertains to options for a secondary bet presented on the mobile device. The secondary content can, via the paired connection with the mobile device, prevent or enable secondary betting based on the state of the primary wagering game content.

In some examples, the secondary content controller can detect and/or intercept certain communications made by the wagering game machine pertinent to the primary wagering game content. In some instances, the secondary content controller can function as a proxy for the communications. For example, the secondary content controller can, as the proxy, obtain funds from a monetary balance associated with the primary wagering game content. The secondary content controller can use the funds to fund the one or more secondary bets related to the secondary content. In some instances, the secondary content controller can, as the proxy, detect events that occur in the primary wagering game to determine whether the one or more secondary bets having winning outcomes. In some instances, the secondary content controller can, as the proxy, add the winnings of the one or more secondary bets to the monetary balance associated with the primary wagering game content. Further, the secondary content controller, as the proxy, can communicate information to an accounting system to ensure that using some of the funds associated with the primary wagering game content complies with given accounting protocols and rules required by the accounting system for the primary wagering game content.

FIG. 1 illustrates an example of conducting one or more secondary bets made by a mobile device paired with a wagering game machine, according to some embodiments. In FIG. 1, a wagering game system ("system") 100 includes a wagering game machine 160 and a mobile device 130. The wagering game machine 160 is configured to present primary wagering game content ("primary content 102"). The wagering game machine 160 includes components that present and/or control the primary content 102. For example, a primary content controller 161 associated with the wagering game machine 160 can present and/or control a wagering game (e.g., the ZEUS wagering game) associated with the primary content 102 via a display 163, and/or via other output devices, such as a speakers, peripheral devices, etc. In some embodiments, the primary content controller 161 is incorporated into the wagering game machine 160. In some embodiments, the primary content controller 161 is configured for a client-server architecture. For instance, the primary content controller 161 can control a client application from the wagering game machine 160. In some embodiments, the client application is a Rich Internet Application (RIA), such as an application that uses the Adobe® Flash® Platform, the Oracle® JavaFX® Platform, the Microsoft® Silverlight® Platform, etc. The client application can present the primary content 102 via the wagering game machine 160. The client application can receive user input, such as a user selection of a payline control 110 (to select a number of pay lines), a bet-per-payline control 114 (an amount to bet on each of the pay lines), or a spin control 118 (to spin virtual reels 108 for the primary content 102). A wagering game server can run a server application. The server application can receive the user data from the client application. The server application can generate control data for the primary content 102 in response to the user data and send the control data to the client application running on the wagering game machine 160. The client application can receive the control data from the wagering game server and alter the presentation of the primary content 102 based on the control data. In some embodiments, the wagering game machine 160 is connected to the wagering game server via a communications network. Further, in some embodiments, the primary content 102 originates from a primary game source, such as from a memory device included in the wagering game machine 160 and/or from the wagering game server external to the wagering game machine 160.

The mobile device 130 is configured to present secondary content 103 from which a secondary bet can be made on whether certain events will occur via the primary content 102. The mobile device 130 controls and presents the secondary content 103 on a display 131 of the mobile device 130 at the same time that the primary content 102 is presented on the display 163 of the wagering game machine 160. In some embodiments, the secondary content 103 is independent of the primary content 102. For instance, the primary content 102 may come from a different source and/or a different content provider than for the secondary content 103 (e.g., the primary content controller 161 controls game content provided by a first game provider while the mobile device 130 controls content provided by a different game provider). In some embodiments, the mobile device 130 operates independently from the primary content controller 161. For instance, the mobile device 130 can have separate hardware, software, firmware, or a combination thereof, from that of the primary content controller 161. Further, the mobile device 130 can use separate processors and separate memory devices than those used by the wagering game machine 160 and/or the primary content controller 161. Further, the mobile device 130 can run a betting application that is separate and independent from a wagering game application run by the primary content controller 161.

The wagering game machine 160 can include a secondary content controller 162 configured to communicate with internal components and devices of the wagering game machine 160. In some instances, the secondary content controller 162 is configured to perform certain functions associated with secondary content 103 (e.g., with secondary content presented via the wagering game machine 160, with the secondary content 103 presented via the mobile device 130, etc.). For example, the secondary content controller 162 can take funds from a gaming session used for the primary content 102 (e.g., from a credit meter 120) to pay for the secondary bet.

The secondary content controller 162 is also configured to communicate with devices external to the wagering game machine 160, such as the mobile device 130. For instance, the secondary content controller 162 can include a wireless beacon that detects when the mobile device 130 is within a given distance (i.e., proximity range). The secondary content controller 162 can detect a request to pair with the mobile device 130, such as via a Bluetooth pairing procedure. The secondary content controller 162 can determine whether the primary content 102 is in a state that would permit pairing. For example, the secondary content controller 162 can determine whether a gaming session has been initiated. For instance, the secondary content controller 162 can determine whether the credit meter 120 is funded. In another instance, the secondary content controller 162 can determine whether a player has logged into the wagering game machine 160 using an account-based-wagering (ABW) player account. After pairing with the mobile device 130, the secondary content controller 162 can initiate a secondary betting session for the mobile device 130 separate from the gaming session associated with the primary content 102.

Once paired, the mobile device 130 presents, via the display 131, the secondary content 103. In some embodiments, a mobile application ("app") of the mobile device 130 presents the secondary content 103 via a betting interface 190. The betting interface 190 presents options to make a secondary bet on the primary content 102. For example, the betting options respond to user input (e.g., selection of user interface objects), which specify a secondary bet, or "side bet" on whether certain events will occur via the primary content 102. For example, the betting interface 190 includes a bet type control 105 from which a user can select a type of side bet (e.g., a proposition bet, a matching bet, etc.). The betting interface 190 also includes a game selection control 107 by which a user can select a game presented via the wagering game machine 160. In some embodiments, the game selection control 107 automatically selects the Zeus slot game if the wagering game machine 160 only offers one wagering game. Furthermore, the mobile device 130 can present an indicator graphic 109. The indicator graphic 109 specifies the primary content 102 (e.g., the indicator graphic 109 is matched with the indicator graphic 104 of the primary content 102). In some embodiments, the secondary content controller 162 provides the information about the primary content 102 through a wireless connection made with the mobile device 130.

The betting interface 190 further includes a bet parameters section 111. The bet parameters section 111 includes a bet control 115, which signifies a type of event that could potentially occur during play of the primary content 102, such as occurrence of a certain symbol 117. A bet control 113 can be selected by the user to specify how many instances of the symbol 117 should appear in the primary content 102 for the secondary bet. A bet control 119 can be used to specify how the symbol 117 should appear (e.g., in a payline, in a primary game, in a bonus game, in a tournament, etc.) A bet control 121 can be used to specify a number of playing rounds by which the secondary bet should occur (e.g., within a given number of spins, within a short period of time, etc.). The secondary bet specified in the bet parameters section 111 indicates that the user of the mobile device bets that five of the symbols 117 will occur in a single payline of the Zeus game within the next 10 spins of the reels 108. A bet meter 123 indicates the cost required to make a specific secondary bet. A bet control 125 can be selected to place the secondary bet. An additional control 127 is configured to make an additional secondary bet, if desired. In some instances, the secondary content controller 162 is configured to take credits from the credit meter 120 (associated with the primary content 102) to pay for the secondary bet. In other words, when the bet control 125 is selected, the secondary content controller 162 determines whether it is authorized to take funds from the gaming session for the primary content 102 (such as by taking sufficient credits specified in the credit meter 120) or whether it must fund the secondary bet in another way (such as by pulling the funds from a player account independent from the gaming session for the primary content 102).

The secondary bet specified in the bet parameters section 111 is just one example of a secondary bet. For instance, the secondary bet type control 105 signifies that the secondary bet is a proposition bet. A proposition bet is a side bet made regarding either the occurrence or non-occurrence, during a game (usually a gambling game), of an event in the game. In some instances, the event does not directly affecting the game's outcome. In other instances the event may be related to an outcome of the game. For example, the proposition bet may be that a given event will occur which is also an event specified in a pay table for the primary content 102. In other examples, the given event may not be specified in a pay table for the primary content 102, but may nonetheless potentially occur during the primary game presented via the primary content 102. In other examples, secondary bet type control 105 may specify other types of bets, such as a "matching" bet, which either mirrors or substantially "matches" a bet made by the player of the primary content 102. For a "matching" type of bet, the bet parameters section 111 may be blank, and the secondary bet would merely match the betting of a player of the wagering game machine 160. In other examples, for a "matching" type of bet, the bet parameters section 111 may include controls by which the user can select a multiplier of the bets made by a player of the wagering game machine 160.

In some embodiments, the secondary content controller 162 is configured to determine whether the primary content 102 is available for secondary betting. For example, the secondary content controller 162 can determine whether the primary content 102 is in an active playing state that could result in a primary game event that is available as one of the betting options of the secondary content 103. If the primary content 102 is in an active playing state (e.g., the reels 108 are spinning), then the secondary content controller 162 can prevent secondary betting via the mobile device 130 until the primary content 102 is in a non-active playing state. For instance, the secondary content controller 162 can send messages to the mobile device 130 (via the pairing) to indicate when the primary content 102 is in an active playing state and when the primary content 102 is in a non-active playing state or idle state. The mobile device 130 can enable and/or disable betting options via the secondary content 103 based on the messages provided by the secondary content controller 162.

Further, in some embodiments, the secondary content controller 162 is configured to detect whether the certain events associated with the secondary bet occur via the primary content 102. If, according to the occurrence of the events for the primary content 102, the secondary bet wins, then the secondary content controller 162 is configured to apply the winnings back to the source from whence the funds for the secondary bet originated. For example, if the secondary content controller 162 is authorized to access funds from the gaming session for the primary content 102, then the secondary content controller 162 can add the winnings back to the credit meter 120. In another instance, if the secondary content controller 162 took funds from a wagering game player account, then the secondary content controller 162 can add the winnings back to the wagering game player account. Further, in some embodiments, if funds for the bet were taken from the credit meter 120, winnings could be returned to the wagering game player account, or vice versa.

Although FIG. 1 describes some embodiments, the following sections describe many other features and embodiments.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram, or accompanying conceptual diagram.

Figure 2:
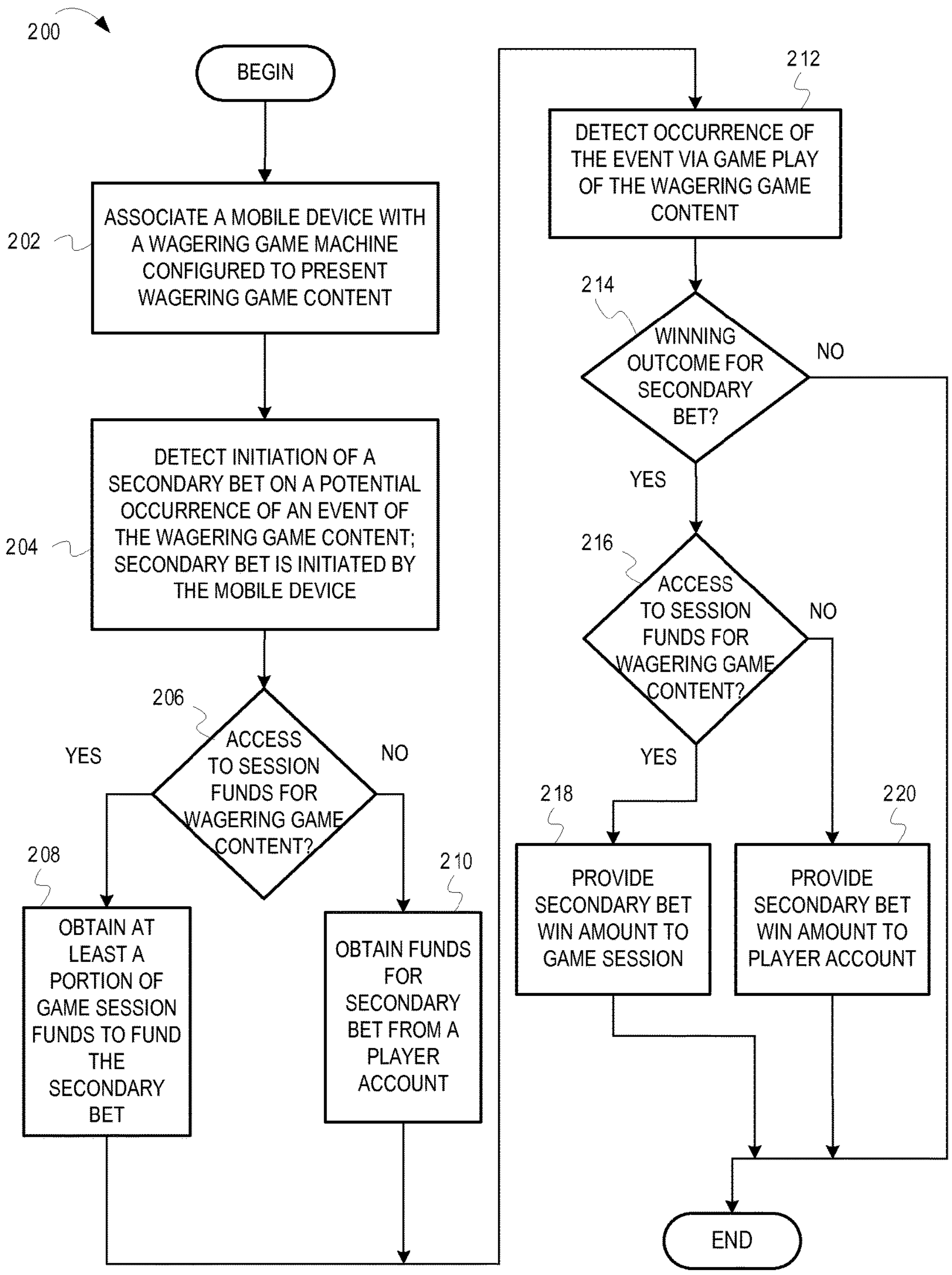
FIG. 2 is a flow diagram illustrating transacting one or more secondary bets made by a mobile device paired with a wagering game machine, according to some embodiments.

FIG. 2 is a flow diagram ("flow") 200 illustrating transacting one or more secondary bets made by a mobile device paired with a wagering game machine, according to some embodiments. FIGS. 3, 4, 5, 6, 7, 8, and 9 are conceptual diagrams that help illustrate the flow of FIG. 2, according to some embodiments. This description will present FIG. 2 in concert with FIGS. 3, 4, 5, 6, 7, 8 and 9.

Figure 3:
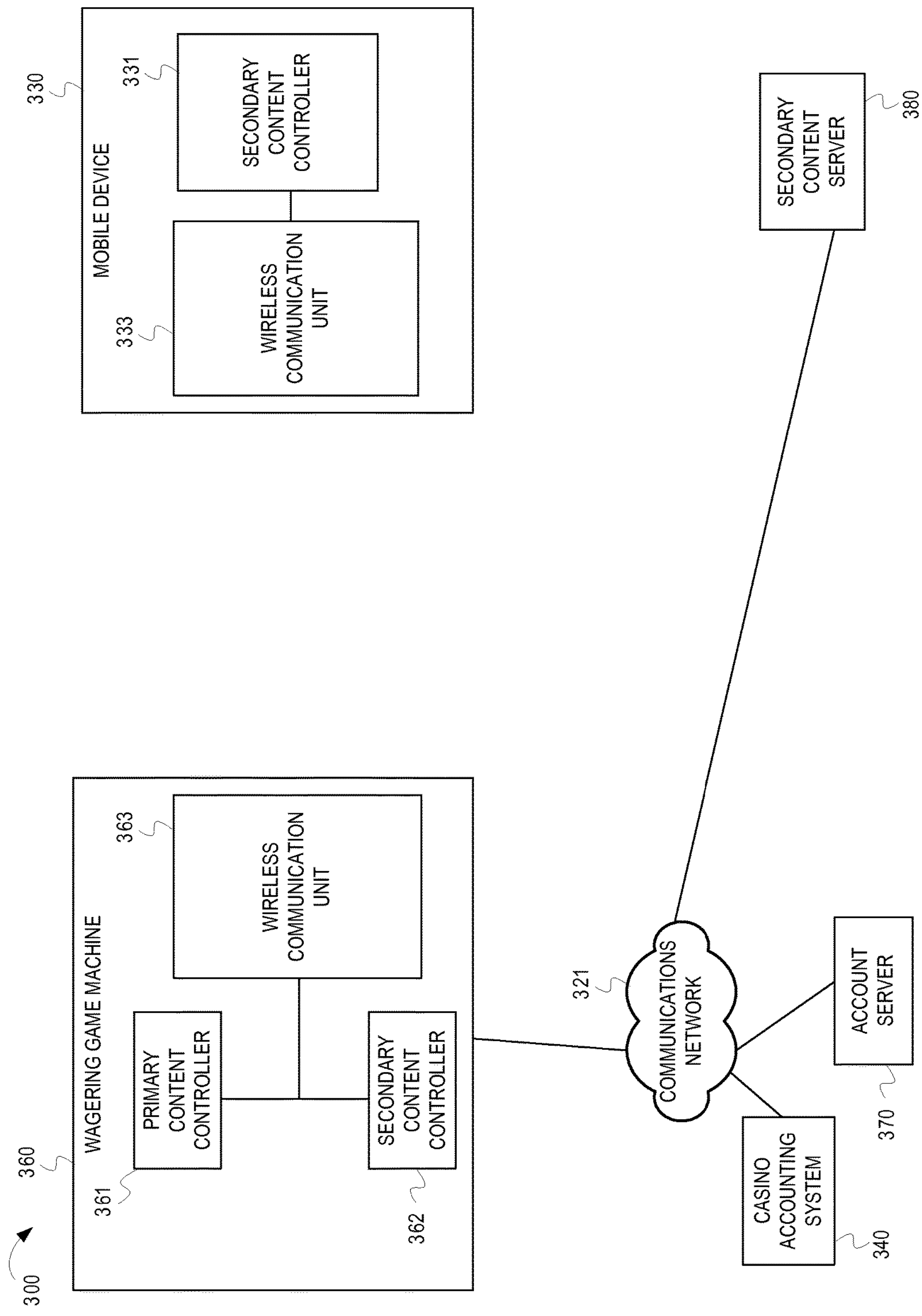
FIGS. 3-9 are illustrations of a wagering game system 300, according to some embodiments.

In FIG. 2, the flow 200 begins at processing block 202, where a wagering game system ("system") associates a mobile device with a wagering game machine configured to present wagering game content. For example, FIGS. 3-9 illustrates an example wagering game system ("system") 300. Referring first to FIG. 3, the system 300 includes a wagering game machine 360, a mobile device 330, a secondary content server 380, a casino accounting system 340, and an account server 370. The system 300 also includes a communications network 321 that connects the wagering game machine 360, the casino accounting system 340, the account server 370, and the secondary content server 380. The wagering game machine 360 includes a primary content controller 361, a secondary content controller 362, and a wireless communication unit 363. The mobile device 330 includes a secondary content controller 331 and a wireless communication unit 333.

In some embodiments, the system 300 is configured to associate the mobile device 330 with the wagering game machine 330. For example, in FIG. 4, at stage "A," a gaming session is funded. The gaming session provides funds for use with primary wagering game content similar to how, in FIG. 1, the wagering game session for the primary content 102 was funded such that credits appeared in the credit meter 120 of the wagering game machine 160. Still referring to FIG. 4, in some examples, after the game session is funded, then the wagering game machine 360 becomes eligible to be paired with the mobile device 330. For instance, the secondary content controller 362 detects when credits are added to the wagering game machine 360, such as when a wagering game player enters a ticket with monetary value into a ticket entry system incorporated into the wagering game machine 360. In some embodiments, when credits are added to the wagering game machine 360, the primary content controller 361 sends a communication to the casino accounting system 340. The secondary content controller 362 can detect the communication made with the casino accounting system 340 and, in return, communicate with the wireless communication unit 363 that the wagering game machine 360 is eligible to be paired for secondary bets.

In some examples, the casino accounting system 340 is a casino accounting host configured to communicate with the wagering game machine 360 to send, and receive, financial data (e.g., accounting data) for financial transactions related to wagering games presented on the wagering game machine 360. In some embodiments, the casino accounting system 340 is incorporated into, or directly connected to, the wagering game machine 360. For instance, the casino accounting system 340 may be contained entirely within the cabinet or casing for the wagering game machine 360. The casino accounting system 340 may be embedded into the wagering game machine 360, included on the motherboard of the wagering game machine 360, attached as a daughterboard, plugged into a backplane or riser card expansion slot of the motherboard of the wagering game machine 360, etc. In other embodiments, however, the casino accounting system 340 may be separate from the wagering game machine 360. For example, the casino accounting system 340 may be incorporated into a server separate from the wagering game machine 360.

In some embodiments, the secondary content controller 362 is contained within the wagering game machine 360. For example, the secondary content controller 362 may be contained entirely within a cabinet or casing for the wagering game machine 360. In some embodiments, the secondary content controller 362 may be embedded into the wagering game machine 360 as an embedded system, a Slot Machine Interface Board (SMIB), a single board computer, a single board smart interface, a system host board, etc. In some embodiments, the secondary content controller 362 may be included on a motherboard of the wagering game machine 360 or attached as a daughterboard. In some embodiments, the secondary content controller 362 may be plugged into a backplane or riser card expansion slot of a motherboard of the wagering game machine 360. Examples of expansion slots may include an Industry Standard Architecture (ISA) expansion slot, a Conventional Peripheral Component Interconnect (PCI) expansion slot, a PCI eXtended (PCI-X) expansion slot, a PCI Express (PCI-e) expansion slot, and so forth. In some embodiments, the secondary content controller 362 is connected via a serial link to the primary game controller 361.

In some embodiments, the secondary content controller 362 is independent from the primary content controller 361, the casino accounting system 340, and/or other elements of the wagering game machine 360 that were originally incorporated into the wagering game machine 360 by a manufacturer of the wagering game machine 360. For example, in some embodiments, the secondary content controller 362 may be incorporated into a part of the wagering game machine 360 after the wagering game machine 360 has been manufactured and/or shipped to a casino. In some embodiments, the secondary content controller 362 is incorporated into a device separate from the wagering game machine 360. The separate device can be communicatively coupled to the wagering game machine 360, such as via a wired connection or a wireless link.

In some embodiments, the secondary content controller 362 is dedicated for communications using the Slot Accounting System (SAS) protocol commercially available from International Game Technology (IGT) of Las Vegas, Nev. Therefore, in some examples, the secondary content controller 362 communicates with the primary content controller 361 using the SAS protocol. The secondary content controller 362 can intercept SAS communications made by the primary content controller 361 to one or more internal components of the wagering game machine 360 and/or to one or more devices external to the wagering game machine 360, such as to the casino accounting system 340. For instance, the secondary content controller 362 intercepts SAS communications made by the primary content controller 361 that are directed to the casino accounting system 340. For example, the secondary content controller 362 determines, based on the intercepted SAS communications, that funds were added to the gaming session of the wagering game machine 360.

At stage, "B," the secondary content controller 362 communicates with the wireless communication unit 363 to begin to transmit a pairing beacon signal. In some embodiments, the wireless communication unit 363 is incorporated onto the secondary content controller 362. In other embodiments, the wireless communication unit 363 is separate from the secondary content controller 362. In some embodiments, when the wireless communication unit 363 begins transmitting the pairing beacon, the secondary content controller 162 can cause a visual indicator to appear on the wagering game machine 360 (e.g., a specific colored light effect associated with the secondary content controller 362, such as a blue and green flashing LED light effect).

At stage "D," the secondary content controller 362 is configured to generate pairing data 414 that will securely link the secondary content controller 362 to the mobile device 330. The wireless communication unit communicates some, or all, of the pairing data 414 to the wireless communication unit 333 of the mobile device 330. The pairing data 414 can include a pairing identifier that uniquely identifies the pairing session between the mobile device 330 and the secondary content controller 362. The pairing identifier can be used at another stage to associate a secondary bet to the pairing. In some embodiments, the wireless communication unit 363 utilizes a wireless technology standard for exchanging data over short distances. In some examples, the wireless technology standard is the Bluetooth wireless technology standard, which uses short-wavelength Ultra-High-Frequency (UHF) radio waves in the ISM band from 2.4 to 2.485 GHz, and which has a range of about 60 meters. In some embodiments, the wagering game machine 360 may be placed on a casino floor, or other location, with various other wagering game machines in close proximity. Therefore, in some embodiments, the wireless communication unit 363 is configured to limit a wireless broadcast range for pairing signals to approximately 0.5 to 1 meter. Because the wireless communication unit 353 broadcasts a limited range, then only mobile devices within that range will detect the signal. Likewise, if other nearby wagering game machines broadcast in limited ranges, the mobile device 330 will detect fewer pairing signals from the other wagering game machines.

In some examples, at stage "D," the secondary content controller 362 can determine whether primary wagering game content is in a state that would permit pairing. For example, the secondary content controller 362 can determine whether a gaming session has been initiated via the wagering game machine 360. For instance, the secondary content controller 362 can determine whether a credit meter is funded. In another instance, the secondary content controller 362 can determine whether a player has logged into the wagering game machine 360 using an account-based-wagering (ABW) player account. The description for FIG. 10 describes various examples of how a secondary content controller can determine whether a mobile device should be paired based on a state of primary wagering game content. If the primary wagering game content is in a state that would permit pairing, then the secondary content controller 362 enables the pairing. If not, then the secondary content controller 362 prevents the pairing.

At stage "C," the mobile device 330 responds to the pairing beacon by launching a native application ("app") related to secondary betting. In some embodiments, the pairing beacon is coded in a certain way to be recognized by the app of the mobile device 330. For example, when the mobile device 330 comes within the communication range of the wireless communication unit 363, the app "wakes up" on the mobile device 330. The app on the mobile device 330 can specify a pairing with the particular wagering game machine 330. For example, if the secondary content controller 362 causes the wagering game machine 360 to present a visual indicator regarding the pairing (e.g., the blue and green flashing LED lights), the app can indicate in a message that states, for instance, "Pair with the wagering game machine that has the blue and green flashing lights?"

The user of the mobile device 330 could then acknowledge whether or not to pair with the wagering game machine 360 that has the visual indicator. For example, the user could select a button in the app that is marked "Initiate Pairing." The button can have a blue and green flashing effect surrounding the button, which corresponds to the blue and green flashing effect on the wagering game machine 360. When the button is selected, the pairing procedure between the mobile device 330 and the secondary content controller 362 would be initiated.

In some examples, the secondary content controller 362 can detect whether the player of the wagering game machine 360 should be notified of the pairing. If the player is notified, and authorizes the pairing, then, at a different stage, the secondary content controller 362 will have the option of using funds from the wagering game machine 360 to fund secondary bets made via the mobile device 330. In some examples, the secondary content controller 362 can detect whether the mobile device 330 has identification data that matches corresponding data for the gaming session of the wagering game machine 360. For instance, the mobile device 330 or the app may store in settings identifying information about the player (e.g., a configuration setting that indicates the owner of the mobile device, contact information for the user stored in a profile related to the app, etc.). In other examples, the user of the mobile device 330 may have to sign in to the app using a user identifier (e.g., a user ID and password, a name, a code, etc.). The mobile device 330 can communicate the identifier, or information associated with the identifier (e.g., the user ID and/or password, the name, the code, etc.). The secondary content controller 362 can determine whether matching information is stored for the gaming session on the wagering game machine 360. For instance, if the player of the wagering game machine 360 has provided a matching user identifier (e.g., a matching user ID and/or password, a matching name, a matching code, etc.) then the secondary content controller 362 can compare the identifiers and/or associated information, to detect a match. In some embodiments, the app could present a prompt via the mobile device 330 to ask whether the player of the wagering game machine 360 should be notified about the pairing (e.g., a prompt that states "Request authorization to access gaming funds from the wagering game machine?"). If the secondary content controller 362 detects that the player of the wagering game machine 360 should be notified of the pairing, then the secondary content controller 362 requests a response from the player.

In other embodiments, however, the secondary content controller 362 does not notify the player of the pairing. For instance, if the user of the mobile device 330 wants to use their own player account to fund secondary bets, then the secondary bet may be independent of any funds associated with the gaming session on the wagering game machine 360. Thus, if the secondary content controller 362 determines that the player should not be notified (e.g., the user of the mobile device 330 indicated not to notify the player of the wagering game machine 360, the identifying information from the mobile device 330 does not match identifying information from the wagering game machine 360, etc.), then the secondary content controller 362 does not notify the player and the pairing continues. In some examples, the secondary content controller 362 may require a pairing code and/or an authorization code be entered into a user interface for the wagering game machine 360. For instance, the app on the mobile device 330 may generate an authorization code (e.g., a personal identifier number (PIN)) that the player of the wagering game machine 360 must enter into the wagering game machine 360 to authorize funds sharing. The mobile device 330 submits the authorization code to the secondary content controller 362 so that the secondary content controller 362 can compare the authorization code when it is entered into the wagering game machine 360. The wagering game machine 360 then presents a prompt for the authorization code via the user interface of the wagering game machine 360. If the player of the wagering game machine 360 is the same as the user of the mobile device 330 or if the player of the wagering game machine 360 desires to provide the user of the mobile device 330 access to funds from the gaming session, then the player can enter the authorization code into the user interface. Otherwise, the player can deny the request.

At stage "D" and "E," the secondary content controller 362 and the secondary content controller 331 perform respective pairing procedures to link the wagering game machine 360 to the mobile device 330. For example, the secondary content controller 362 transmits the pairing identifier to the secondary content controller 331. The secondary content controller 331 can acknowledge the pairing identifier. The pairing establishes a Bluetooth connection 320 between the secondary content controller 362 and the secondary content controller 331.

In some embodiments, for security purposes, only one mobile device might may be permitted to be pair with a wagering game machine at the same time. Yet, in other embodiments, multiple mobile devices can be paired with a single wagering game machine. For example, if all of the mobile devices are part of a shared community game or if multiple users want to bet on activity of the player of the wagering game machine 360. In this case, each of the users of the multiple mobile devices may utilize separate wagering game player accounts ("player accounts") of an Account Based Wagering System (ABWS) to fund their individual secondary bets via their respective mobile devices. In some embodiments, users of the mobile devices can transfer coins between player accounts using a mobile device app installed on each of the mobile devices. This could be done by Advanced Funds Transfers (AFTs) between the player accounts.

As previously mentioned, the wagering game machine 360 may present a visual indicator regarding the pairing (e.g., blue and green flashing LED lights). The app can also present a matching visual indicator (e.g., a blue and green flashing effect surrounding a button) so that the user of the mobile device 330 can be visually informed that the pairing will be with the wagering game machine 360. When the secondary content controller 362 and the mobile device 330 are paired, the visual indicator presented via the wagering game machine 360 can change to signify the pairing (e.g., the blue and green flashing LED lights displayed on the wagering game machine 360 can change to a non-flashing blue light). Similarly, the matching visual indicator on the app can change to signify the pairing (e.g., the blue and green flashing indicator on the app can change to a non-flashing blue light).

Referring momentarily back to FIG. 2, the flow 200 continues at processing block 204, where the system detects initiation of a secondary bet on a potential occurrence of an event of the wagering game content. The secondary bet is initiated by the mobile device. For example, in FIG. 4, at stage "F," after the pairing procedure is completed, the secondary content controller 331 of the mobile device 330 establishes a secure wireless link with the secondary content server 380 via a secure wireless network 322. Information from the wagering game machine 360, such as information about the primary wagering game content, information about funding, etc., can be communicated, via the communications network 321, between the secondary content controller 362 and the secondary content server 380. The secondary content server 380 can then send the information to the secondary content controller 331 (via the wireless communication unit 333) using the secure wireless link.

At stage "G," the secondary content controller 362 communicates data 365 regarding the primary wagering game content. For example, the secondary content controller 362 can send to the mobile device 330 information that explains what primary wagering game content is being played on the wagering game machine 360. The secondary content controller 362 can also send to the mobile device 330 information about game elements, game functions, game history, player data, etc., that can result in events that may possibly occur during the gaming session. The information can be used to present possible betting parameters via the app of the mobile device 330, which betting parameters are related to events of the gaming session related to the primary wagering game content. For example, referring momentarily back to FIG. 1, when the mobile device 131 is paired with the wagering game machine 160, the secondary content 103 can show the indicator graphic 109 that specifies the name of the wagering game presented in the primary content 102. The secondary content 103 also presents the symbol 117 in the bet control. To provide the indicator graphic 109 and/or the symbol 117, the app associated with the secondary content 103 needs information about what the wagering game was presented via the primary content 102 and what the potential events might be for the wagering game (e.g., what are the symbols of the wagering game that might occur for various stop-reel configurations). Consequently, the secondary content controller 162 can transmit that information about the primary wagering game to the mobile device 130. Likewise, referring back to FIG. 4, at stage "G," the secondary content controller 362 sends to the mobile device the information 365 associated with the primary wagering game content.

In some embodiments, at stage "H," after the secondary content controller 362 sends the information 365 to the secondary content server 380, the secondary content server 380 uses the information 365 to determine the secondary content to provide to the app, and then provides secondary content data 381 to the mobile device 330. For instance, the secondary content server 380 may provide theme information, icons, or other information/content relevant to the primary wagering game. The app can use the information and content to present the bet possibilities. In some examples, the secondary content server 380 can generate a list of possible game events to present in the app of the mobile device 330. For instance, the secondary content server 380 may (a) generate entries for a dropdown menu or list of events for secondary wagers, (b) specify types of events that may occur in a primary wagering game, (c) specify functions or settings of the primary wagering game, etc. For example, if the secondary content server 380 were used in FIG. 1, the secondary content server 380 could determine the information to put into the bet parameters section 111 based on the content elements, functions, etc. of the primary content 102. For instance, the secondary content server 380 could determine what all of the possible reel symbols were for the Zeus game and provide the symbols to the mobile device 130 to specify a dropdown listing of all of the symbols in the bet control 115. The secondary content server 380 could further determine a maximum number of symbols that might appear in a payline of the Zeus game (e.g., a five reel game can have a maximum of five symbols in a row) and, thus, limit the number in the second secondary content control 113 to be a maximum of five. The secondary content server 380 can further determine that the Zeus game is a "slot" type of game (e.g., as opposed to a card game or some other type of game), and therefore determine that the information in the bet control 119 should be related to slot types of games (e.g., paylines occur in a slot type of game, whereas "hands" occur in a card type of game). The secondary content server 380 could include in the bet control 119 items that may, in some instances, be directly associated with a game outcome for the primary wagering game, a payable event of the primary wagering game, etc. For example the bet control 119 specifies that an event occurs in a payline (used for determine game payouts in the primary game). In other examples, however, the secondary content server 380 could include in the bet control 119 items that may not be directly related to a game outcome or payable event. For example, the bet control 119 could specify that the symbol 117 could appear in rows and/or columns of the reels 108 (e.g., anywhere on the reels, all in one reel, or a specific geometrical pattern across the reels, etc.) versus only being in a payline that is spread horizontally across symbols from all five of the reels 108. The secondary content server 380 could further determine an amount for the secondary bet specified in the bet meter 123 based on odds of occurrence of the event or events specified in the bet parameters section 111.

Though not shown, in some embodiments, other controls for the secondary content 103 may instead, or in addition, include controls to predict a timing for the event(s), a location for the event(s), a pattern for the event(s), conditions for the event(s), etc. For example, the controls could specify whether the event(s) occur in a primary wagering game versus in a bonus game or a secondary wagering game. In some examples, the controls could specify whether the event(s) occur in the gaming session for the primary content 102 or in another game for another player in a tournament or community game. In some examples, the controls could specify whether the event(s) occur within a given time period. In some examples, the controls could specify whether specific reel symbols will appear in specific sequences. In some examples, the controls could specify whether a certain number of wins or losses will occur within a given number of game play rounds or a time period.

Referring back to FIG. 4, at stage "H", the secondary content server 380 sends to the mobile device 330, via the secure wireless network 322, secondary content data 381 (e.g., the data that specifies the secondary content to present via the app). In some instances, the app on the mobile device 330 already includes specific content to present (e.g., the app includes reels symbols, possible events, etc. related to a variety of primary wagering games). The secondary content server 380 and/or the secondary content controller 362 may only need to identify the primary wagering game being played on the wagering game machine 360. In some embodiments, the secondary content controller 362 can also send information directly to the mobile device 330 regarding the wagering game machine 360, regarding the primary content, regarding events, etc. The secondary content controller 362 can send the information directly to the mobile device 330 via the Bluetooth connection 320.

Furthermore, in some embodiments, the secondary content controller 362 and/or the secondary content server 380 can send to the mobile device 330 additional content that adds to the experience of being paired with the wagering game machine 360. For example, the secondary content controller 362 and/or the secondary content server 380 can send to the mobile device 330 side games to play along with the primary wagering game content, bonus rounds that connect to the primary wagering game content, etc.

Figure 4:
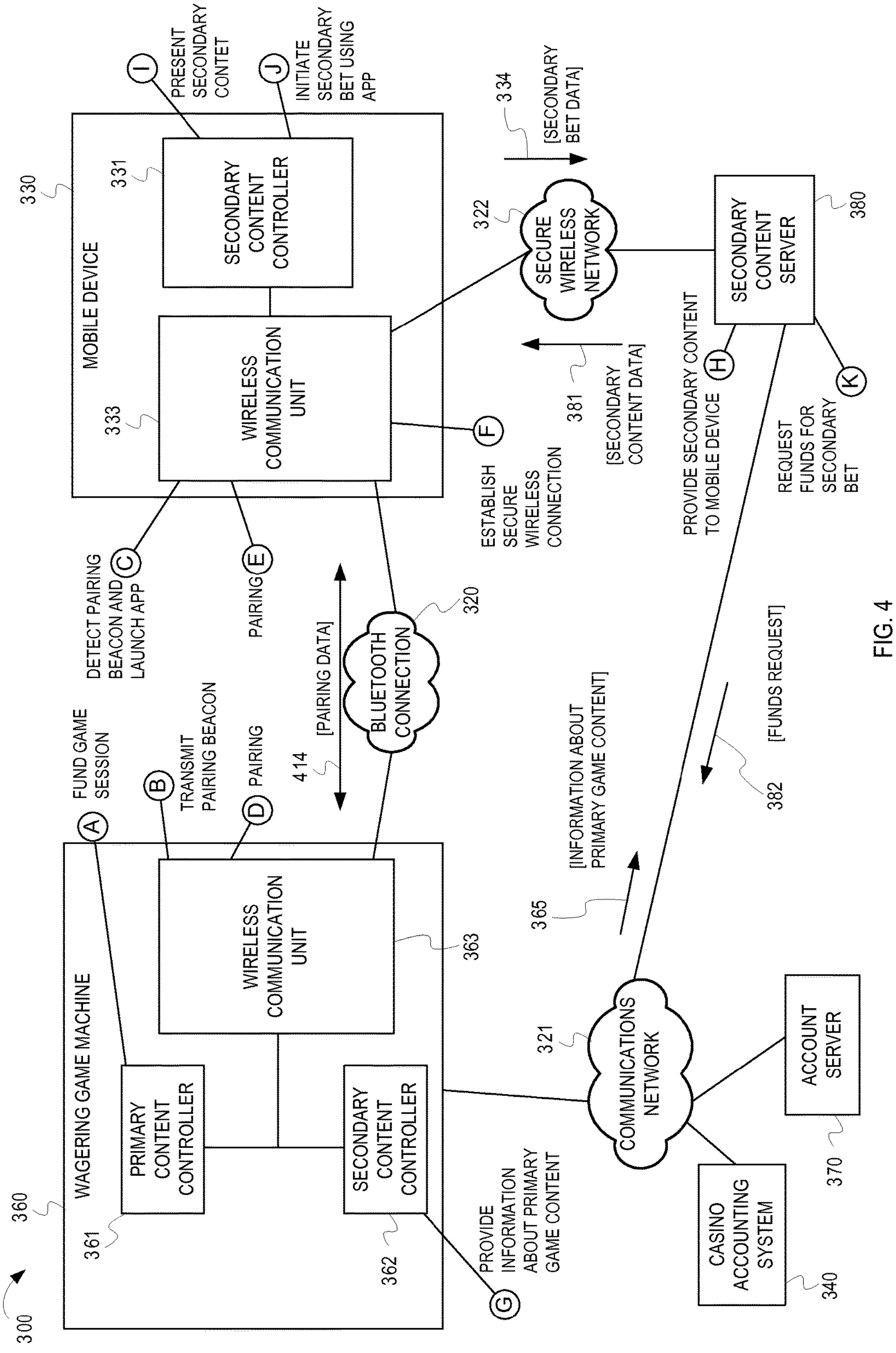

Still referring to FIG. 4, at stage "I," the secondary content controller 331 presents, via the app, secondary content associated with the secondary content data 381. For instance, the secondary content controller 331 presents the secondary content 103 shown in FIG. 1. In some examples, at stage "I," the secondary content controller 362 can determine whether primary wagering game content is in a state that would permit secondary betting on the primary wagering game content. For example, the secondary content controller 362 can determine whether the primary wagering game content is in an active playing state that could result in a primary game event that is available as one of the betting options of the secondary content. If the primary wagering game content is in an active playing state then the secondary content controller 362 can prevent secondary betting via the mobile device 330 until the primary wagering game content is in a non-active playing state. For instance, the secondary content controller 362 can send messages to the mobile device 330 (via the Bluetooth connection 320) to indicate when the primary wagering game content is in an active playing state and when the primary wagering game content is in a non-active playing state (e.g., an idle state or any other state that would not result in a primary game event indicated on a betting option of the secondary content). The secondary content controller 331 of the mobile device 330 can enable and/or disable betting options via the secondary content based on the messages provided by the secondary content controller 362. The description for FIG. 11 describes several examples of how a secondary content controller can determine whether primary wagering game content is in a state that would permit secondary betting.

In FIG. 4, at stage "J," the secondary content controller 331, in response to user input via the app, initiates a secondary bet (e.g., in response to selection of the bet control 125 shown in FIG. 1). In one example, the app provides a menu to select "Five-of-a-kind" proposition bet (meaning that the proposition bet will be that either the player's hand on the wagering game machine 360, or some other character's hand in the primary wagering game, will show a "five-of-a-kind" within a certain number of playing rounds). Other examples of proposition bets ("prop bets") can be based on any type of event in the primary wagering game, such as a symbol combination prop bet where a side-bet is placed on whether a certain combination of symbols appear in the primary game (as depicted in FIG. 1). Another example is a bonus multiplier prop bet where a side bet is placed to predict that if a bonus game occurs in a given number of subsequent game-play rounds (e.g., next 10 spins) of the primary wagering game, then a multiplier will apply in the bonus game. In some examples, if the bonus game does not trigger within the subsequent number of game play rounds, then a bonus round can be triggered without the multiplier. Another example of a prop bet is a side bet that predicts whether a certain number of win streaks or lose streaks will occur within a given number of subsequent game-play rounds of the primary wagering game. Another example of a prop bet is a side bet that predicts whether a winning hand is placed on a deal. Another example of a prop bet includes a side bet that is based on a collection of a certain number of game play hands (e.g., collecting a certain type of 4 of a kind hands and placing them on a bingo card).

After the secondary bet is initiated, the secondary content controller 331 sends secondary bet data 334 to the secondary content server 380. For instance, the secondary content controller 331 sends a signal to the secondary content server 380 that the bet control 125 (shown in FIG. 1) was selected. In some examples, the secondary content controller 331 may also send to the secondary content server 380 all information specified in the betting interface 190 that is pertinent to the secondary bet. In other instances, some, or all, of the information shown by the app (e.g., shown in the betting interface 190 of FIG. 1) may be stored on the secondary content server 380 (e.g., as soon as each of the betting controls is specified) and stored there until the secondary bet is activated (e.g., until the bet control 125 of FIG. 1 is activated).

Referring still to FIG. 4, at stage "K," the secondary content server 380 requests funds for the secondary bet. In some embodiments, the secondary content server 380 sends a funds request 382 to one or more of the secondary content controller 362 and the account server 370, depending on whether or not the secondary content controller 362 has been authorized to use funds from the gaming session. In some embodiments, the secondary content server 380 requests the funds as soon as the secondary content server 380 has all of the secondary bet data 334 pertinent to the secondary bet (e.g., after stage "J"). However, in other examples, the secondary content server 380 could obtain funds for the secondary bet prior to the secondary bet being made (e.g., prior to the bet control 125 of FIG. 1 being activated) or while the parameters for the secondary bet are being set (e.g., while the controls in the bet parameters section 111 are being set).

Figure 5:
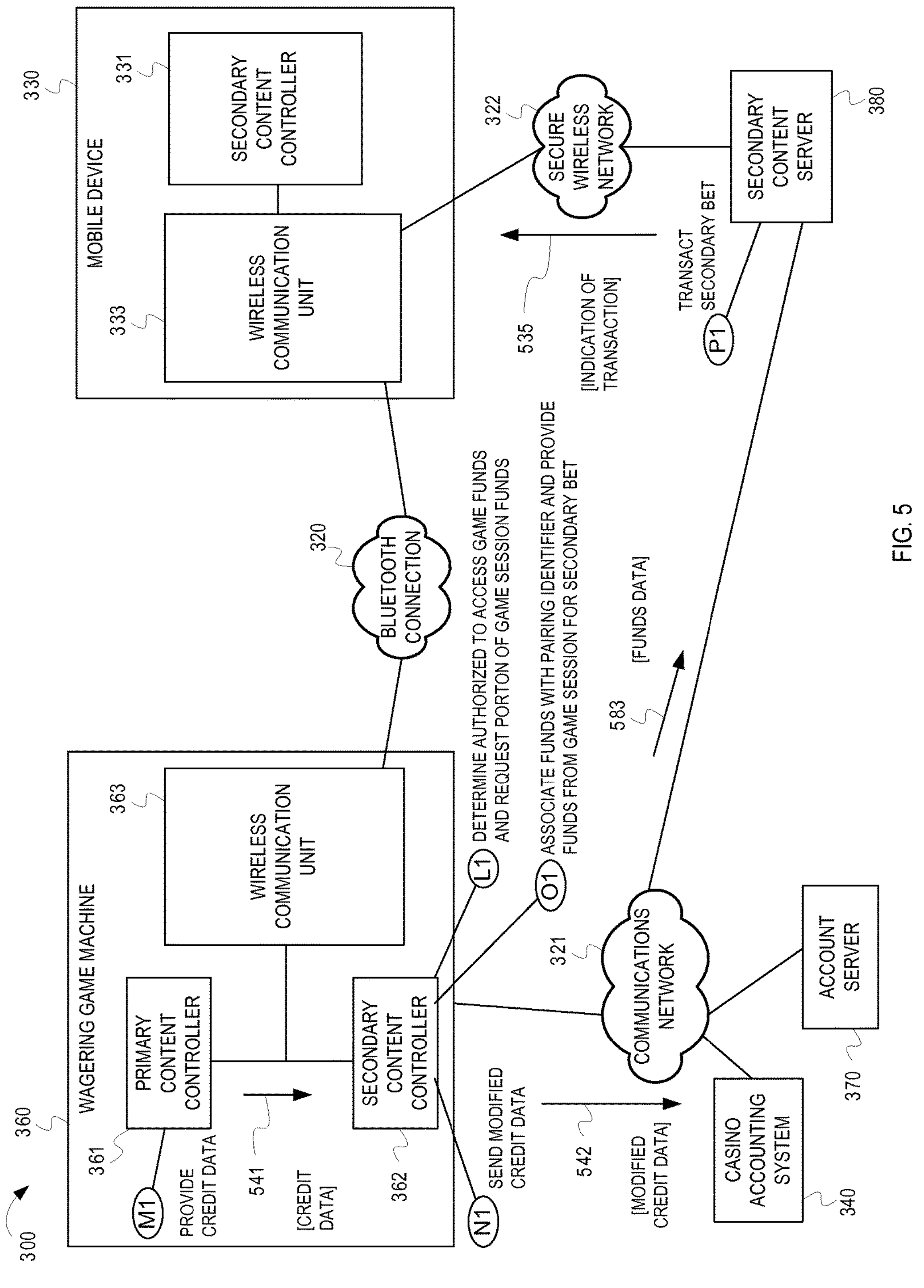
Figure 6:
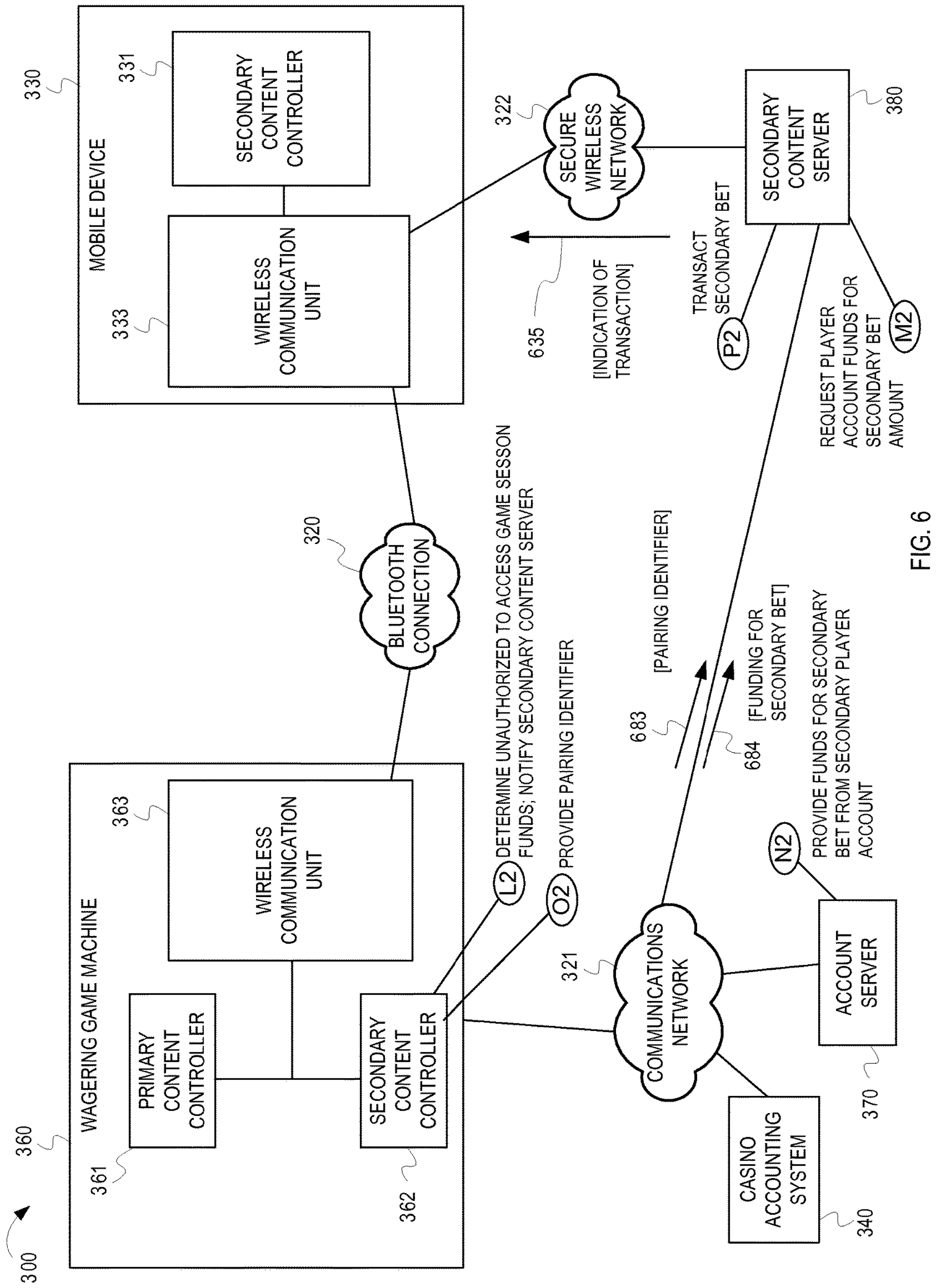

Returning momentarily to FIG. 2, the flow 200 continues at processing block 206, where the system determines whether there is authorization to access session funds for the wagering game content. For example, FIGS. 5 and 6 illustrate two different ways of obtaining funds for the secondary bet. The first way, shown in FIG. 5, illustrates an example of obtaining funds from the gaming session of the wagering game machine 360. FIG. 5 is pertinent to processing block 208. The second way, shown in FIG. 6, illustrates an example of obtaining funds from a player account. FIG. 6 is pertinent to processing block 210.

Referring first to the example of FIG. 5, at stage "L1," the secondary content controller 362 receives the request for funds made by the secondary content server 380 and determines that it is authorized to access game funds. For instance, the secondary content controller 362 can determine whether the player of the wagering game machine 360 has authorized the mobile device 330 to use gaming funds. For instance, the app of the mobile device 330 can present a prompt that states, "Request authorization to access gaming funds from the wagering game machine?" The secondary content controller 362 then presents a prompt to the player of the wagering game machine 360 to authorize use of the funds. In some embodiments, during the pairing procedure explained in FIG. 3, the secondary content controller 362 can require a pairing code and/or an authorization code (e.g., a PIN) be entered into a user interface for the wagering game machine 360. If the pairing code and/or authorization code are entered at that time, and acknowledged by the player of the wagering game machine 360, then the secondary content controller 362 can determine, at stage "L1," that it has authority to access funds from the gaming session. In other examples, the secondary content controller 362 determines, implicitly, that access to the gaming session funds are authorized. For example, the secondary content controller 362 can detect identifying information associated with the gaming session and with the mobile device 330 to determine if they match. For example, the player may have logged into the wagering game machine 360 by using a username and password, by using a player tracking card, by entering a PIN, etc. The username and password, identifiers for the player tracking card, the PIN, etc. may be stored on the mobile device 330 or associated with the app. The secondary content controller 362 can automatically detect the identifying information provided during logon to the wagering game machine 360 and compare it with the data stored on the mobile device 330. If the comparison results in a match, then the secondary content controller 362 can, without explicit acknowledgement by the player of the wagering game machine 360, determine that the secondary content controller 362 is authorized to access gaming session funds.

Still referring to stage "L1," after the secondary content controller 362 determines that it is authorized to access session funds for the gaming session of the wagering game machine 360, the secondary content controller 362 requests a portion of game session funds equivalent to an amount of the secondary bet.

Returning momentarily to FIG. 2, the flow 200 continues at processing block 208, where the system obtains at least a portion of the session funds to fund the secondary bet. Again, FIG. 5 illustrates some examples. Referring again to FIG. 5, as mentioned previously, at stage "L1," the secondary content controller 362 requests a portion of game session funds. At stage "M1," the primary content controller then transfers the funds using a SAS communication that indicates credit data 541.

Referring to stage "L1," in some examples, the secondary content controller 362 transfers funds to the secondary content server 380 using SAS spoofing. The secondary content controller 362 then makes the casino accounting system 340 aware of the reduction in game credits on the wagering game machine 360, via AFT, as if the credits were bets for the primary wagering game, even though they are secondary bets on the secondary content. The casino accounting system 340 is configured to receive data messages from, and send data messages to, either or both of the primary content controller 361 and the secondary content controller 362. For example, the casino accounting system 340 is configured to send and receive data messages using the SAS protocol. The casino accounting system 340 is configured to perform operations that can separately account for certain financial transactions made for the primary wagering game content. For example, the casino accounting system 340 is configured to communicate with the primary content controller 361 to account for financial data associated when monetary value is added to a credit meter for the primary wagering game content, when bets are made for the primary wagering game content, when winning outcomes occur for the primary wagering game content, when win amounts are added to the credit meter, when a balance of funds (e.g., an amount in the credit meter) is cashed out of the wagering game machine 360, or for any other type of financial activity associated with the primary wagering game content.

In some embodiments, the primary content controller 361 is specifically manufactured and/or configured by the same game provider that manufactures the wagering game machine 360. Thus, in some examples, the programming for the primary content controller 361 is specifically configured for use with the wagering game machine 360. Further, the secondary content controller 362 may originate from a different manufacturer than the manufacturer for the wagering game machine 360 or the primary content controller 361. The secondary content may come from a third-party source separate from a game provider for the primary wagering game content. Therefore, in some embodiments, the primary content controller 361, and various financial related elements of the wagering game machine 360 (e.g., the ticket-in-ticket-out system, the betting controls, the cash-out button, the ticket printer, etc.) may be specifically programmed to respond for only the primary wagering game content and not for the secondary content or the mobile device 330. As such, the primary content controller 361 may be configured to communicate directly with the casino accounting system 340 and not with the secondary content controller 362.

According to some embodiments, the secondary content controller 362 is configured to send commands to the primary content controller 361 that would cause the primary content controller 361 to send a communication to the casino accounting system 340 regarding the amount of funds requested from the gaming session. For example, the secondary content controller 362 spoofs the casino accounting system 340 and sends a SAS command to the primary content controller 361 to transfer a certain amount of funds to the casino accounting system 340.

Referring now to stage "M1," when the primary content controller 361 transfers the funds (using a SAS communication that indicates credit data 541), the credit meter on the wagering game machine 360 reduces by the amount for the secondary bet specified in the credit data 541. In some examples, the wagering game machine 360 has a credit meter, but the app on the mobile device 330 does not. Individual credits can be transferred from the credit meter on the wagering game machine 360 when needed for a secondary bet of the app on the mobile device 130. In other examples, however, more credits can be transferred from the credit meter than are needed for one secondary bet. For example, the app on the mobile device 330 may have a second credit meter. Some, or all, of the funds can be transferred off the wagering game machine 360 and stored via the secondary content server 380 and/or via the mobile device 330. If the all of the funds are transferred to the mobile device 330, the mobile device 330 (and/or the secondary content server 380) can transfer funds back to the wagering game machine 360 for bets made on the primary wagering game content (which could then cause the first credit meter on the wagering game machine 360 to have credits). In some examples, some funds are on the first credit meter for multiple primary game bets and some funds are on the second credit meter for multiple secondary bets. The wagering game machine 360 can access the funds from the first credit meter for bets made for the primary wagering game content. The mobile device 330 can access the funds from the second credit meter for secondary bets.

Referring still to stage "M1," the primary content controller transfers the funds using a SAS communication that indicates the credit data 541. The credit data 541 is directed to the casino accounting system 340. However, the secondary content controller 362 intercepts the credit data 541 sent by the primary content controller 361 and spoofs the casino accounting system 340. In other words, the secondary content controller 362 intercepts messages sent by the primary content controller 361 to the casino accounting system 340, uses data from the messages, and then sends modified data to the casino accounting system 340. For instance, at stage "N1," the secondary content server 362 intercepts the credit data 541 and sends a modified SAS message to the casino accounting system 340. The modified SAS message indicates that the amount of funds from the credit data 541 was actually spent on a wager on the primary wagering game, even though the funds are not spent on a wager of the primary wagering game. In some embodiments, the secondary content controller 362 provides SAS communications to the secondary content server 380 (e.g., money transactions, play activity of the wagering game machine 360, etc.) and/or to any other device or component associated with a wagering game network (e.g., to a primary wagering game server, to an account-based wagering server, etc.), in addition to sending SAS communications to the primary content controller 361 and the casino accounting system 340.

At stage "O1," the secondary content controller 362 can associate the funds with the pairing identifier and then send funds data 583 to secondary content server 380. The funds data 583 can specify the amount of the funds from the credit data 541 as well as the pairing identifier.

At stage "P1," the secondary content server 380 transacts the secondary bet. For example, the secondary content server 380 creates a secondary session account (e.g., an anonymous account) into which the funds are deposited for secondary bets. In some embodiments, the secondary session account may be created earlier, such as when the wagering game machine 360 and the mobile device 330 are paired. A "virtual wallet" program of the secondary content sever 380 controls the funds in the secondary session account. As a security measure, the virtual wallet program may require the pairing identifier before it will deposit funds into the secondary session account. In some embodiments, the secondary session account is a floating session account such that when the mobile device 330 is unpaired with the wagering game machine 330, the credits can remain with the mobile device 330 (and/or with the secondary content server 380) until the mobile device 330 pairs with another wagering game machine.

Also at stage "P1," the secondary content server 380 sends data 535 to the mobile device 330 via the secure wireless network 322. The data 535 indicates that the secondary bet was transacted. The mobile device 330 receives the data 535 and the app indicates that the secondary bet was transacted. For example, the app can show an indicator that the secondary bet was placed. In some embodiments, the secondary content controller 331 can show a secondary credit meter that increments in the app for the amount of the bet, and then decrements when the bet is made. In other embodiments, however, the app does not show a credit meter. Further, in some embodiments, after the mobile device 330 receives the data 535, if there is a time parameter or playing round parameter associated with the secondary bet, the app can begin counting down the time and/or the number of playing rounds of the primary wagering game.

In some embodiments, the secondary content server 380 can communicate directly with the casino accounting system 340 and/or with the account server 370. For example, the secondary content server 380 can send SAS commands or instructions directly to the casino accounting system 340 instead of, or in addition to, sending SAS communications to the secondary content controller 362.

Returning momentarily to FIG. 2, at processing block 206, if the system determines that there is no authorization to access session funds for the wagering game content, then, at processing block 210, the system obtains funds for the secondary bet from a player account independent of the game session for the wagering game content As mentioned previously, FIG. 5 illustrated an example of taking funds from a gaming session for the wagering game machine 360. In other examples, such as that shown in FIG. 6, the funds from the gaming session are not accessible for use with secondary bets. For instance, FIG. 5 may be pertinent to a scenario where a first player is playing on the wagering game machine 360 and the first player wants to side-bet on the events for the wagering game machine 360. Thus, the same player can pair the mobile device 330 to the wagering game machine 360 and authorize access to the gaming session funds for the wagering game machine 360. In other embodiments, however, authorization may not be given to access the gaming session funds for the wagering game machine 360. For example, the player may not give authorization to access the gaming session funds for the wagering game machine 360 and may instead prefer to make secondary bets using a separate player account. Similarly, a second player may want to side-bet on the events for the wagering game machine 360 and does not have authority to access the gaming session funds. In such a scenario, then either the first player or the second player may pair the mobile device 330 with the wagering game machine 360 and side bet using the separate player account. In the example where a first player is playing on the wagering game machine 360 and a second, separate player is using the mobile device 330, the second player may request to pair the mobile device 330 with the wagering game machine 360. The operations of Stages "A" through "K" shown in FIG. 4 could be performed to pair the second player's mobile device (e.g., mobile device 330) to the wagering game machine 360. The operations of stages "L1" through "P1" shown in FIG. 5, however, may not be applicable to that scenario (unless the first player at the wagering game machine 360 were to authorize the second player to use the first player's funds on the wagering game machine 360). In an example where the second player does not have access to the first player's funds, the operations of Stages "L2" through "P2" in FIG. 6 are applicable.

In FIG. 6, the mobile device 330 must use a separate account to fund secondary bets. No money is transferred from the wagering game machine 360 to the mobile device 330 or to the secondary content server 380. Instead, money is transferred from the account server 370 to the mobile device 330 and/or to the secondary content server 380.

Referring to FIG. 6, at Stage "L2" the secondary content controller 362 determines that it is not authorized to access funds from the gaming session. In some embodiments, in response to determining that it does not have access to funds from the gaming session, the secondary content controller 362 notifies the secondary content server 380 so that the secondary content server 380 can request funds from the account server 370. In other embodiments, the secondary content controller 362 can make the request for funds directly to the account server 370. The account server 370 can provide the funds to the secondary content server 380 via the communications network 362. For instance, the secondary content controller 362 can detect login credentials for the player account stored on the account server 370. The login credentials may be provided during the pairing operation with the mobile device 330 (e.g., a user of the mobile device 330 provides their login credentials into the app, and the app communicates those credentials to the secondary content controller 362). In yet other embodiments, the secondary content server 380 can request funds from the account server 370 prior to, or instead of, the secondary content controller 362 determining that it is unauthorized to access game session funds. In some embodiments, the secondary content controller 380 requests funds from the account server 370, and notifies the secondary content controller 362 that funds were requested from the player account for the secondary bet.

At stage "M2," the secondary content server 380 requests funds from the player account to pay for the secondary bet. In one example, the secondary content controller 362 detects login credentials for the player account stored on the account server 370. For example, the login credentials may be provided via the app on the mobile device 330. For instance, when the mobile device 330 pairs with the wagering game machine 360, the app can require login credentials for the player account. In other embodiments, if the mobile device 330 does not pair with the wagering game machine 360, when the user launches the app, the app can require login credentials for the player account. The app communicates those credentials to the secondary content server 380. The app can present a credit meter that shows an amount of credits in the player account.

In some embodiments, the player account can provide funds for any fee associated with wagering game machine 360 and/or the mobile device 330. For example, tournament fees can be paid from the player account prior to pairing. The tournament may be related to games played on the wagering game machine 360 and/or to possible secondary bets made via the app on the mobile device 330.

At stage "N2," the account server 370 receives the request for the user account and accesses the user account (e.g., using the login credentials provided by the secondary content server 380). The account server 370 then transfers and/or transacts the amount of funds needed for the secondary bet from the player account (e.g., the account server 370 provides transaction data 684 which identifies the funding for the secondary bet). In some embodiments, at stage "O2," the secondary content controller 362 can detect the communication made by the account server 370 regarding the funds for the secondary bet. The secondary content controller 362 can provide the pairing identifier 683 to identify that the funding is associated with a paired session between the mobile device 330 and the wagering game machine 360.

At stage "P2," the secondary content server 380 transacts the secondary bet (e.g., provides data 635 which indicates that the funds were attained for the secondary bet and that the secondary bet was transacted). If a credit meter for the player account is shown in the app, then the credit meter decrements by the amount of the secondary bet.

Figure 7:
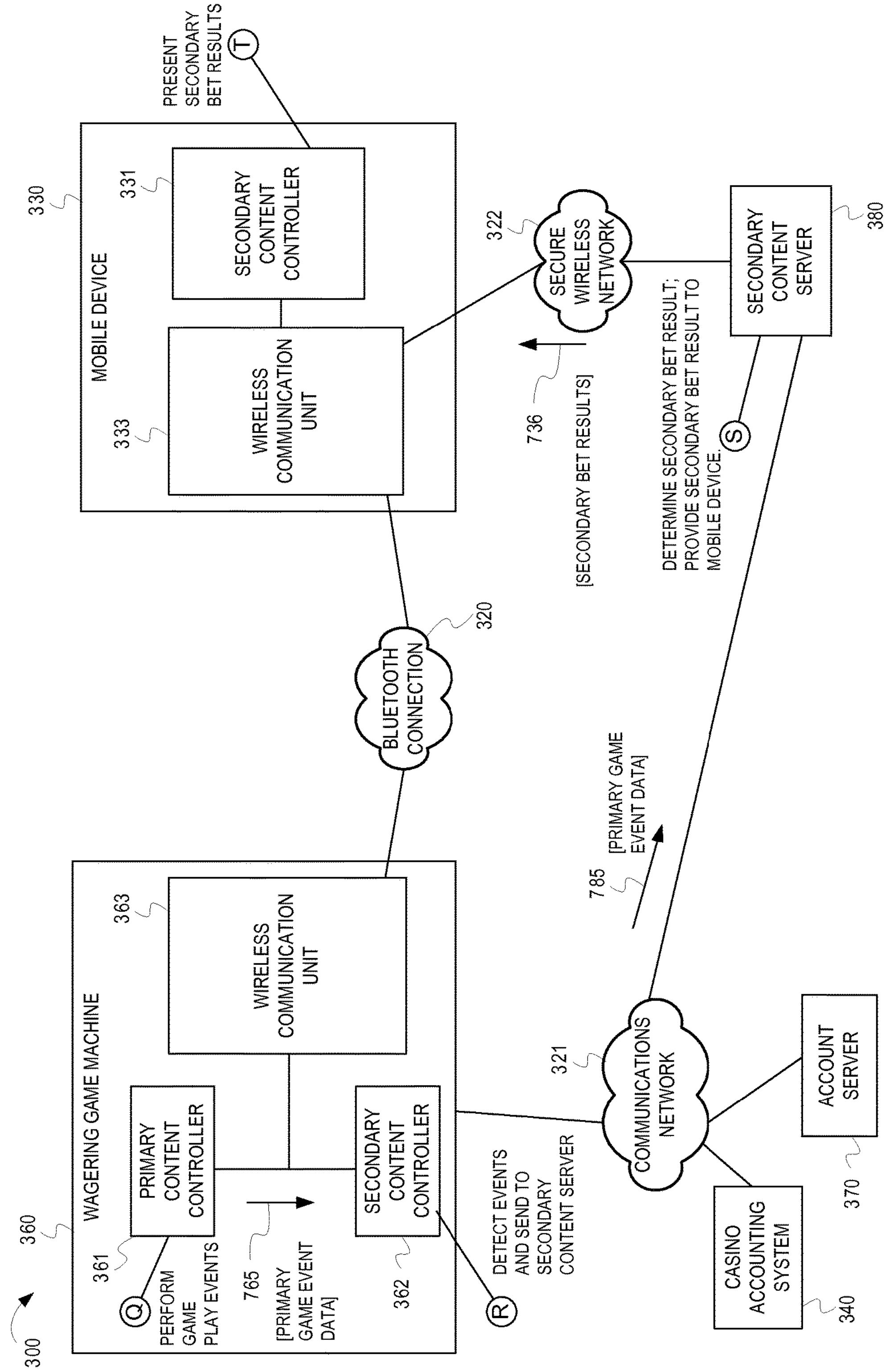

Returning momentarily to FIG. 2, the flow 200 continues at processing block 212, where the system detects occurrence of the event via game play of the wagering game content. FIG. 7 illustrates an example. Referring to FIG. 7, at stage "Q," the primary content controller 361 continues to present the primary game content. The primary content controller 361 generates primary game event data 765 for any events that occur in the primary game content, such a via a game, or a series of games, presented via the primary wagering game content.

At stage "R," the secondary content controller 362 detects the events from the primary game event data 765. The secondary content controller 362 can send to the secondary content server 380 data 785 that identifies events from the primary game event data 764. In some embodiments, the secondary content controller 362 filters the primary game events and sends, in the data 785, only information about relevant events to the secondary bet (e.g., the secondary content controller 362 has a filter that detects when an event is relevant to betting parameters set for the secondary bet). In other embodiments, the data 785 includes all primary game event data, which the secondary content server 380 can parse and/or analyze to determine which of the data is relevant to the secondary bet.

In some embodiments, the secondary content controller 362 sends game event data directly to the mobile device 330. In other examples, the mobile device 330 can take information directly from the wagering game machine 360 (e.g., sniff events, such as game outcome data, from the secondary content controller 362 via the Bluetooth connection 320). In some embodiments, the mobile device 330 can take information from the secondary content server 380 via the secure wireless link.

Returning momentarily to FIG. 2, the flow 200 continues at processing block 214, where the system determines whether there is a winning outcome for the secondary bet. For example, in FIG. 7, at stage "S," the secondary content server 380 determines whether an event occurs in the primary wagering game that results in an outcome for the secondary bet. For instance, referring momentarily to FIG. 1, the secondary content server 380 could detect events from the primary content 102 to determine whether five instances of the symbol 117 had occurred in a payline within the last 10 spins made since the secondary bet was placed.

Referring back to FIG. 7, at stage "T," the secondary content controller 331 of the mobile device 330 presents results for the secondary bet. For example, if the secondary bet did not win, the app on the mobile device 330 indicates that there was no win. If there was a win, then the app indicates that the secondary bet resulted in a win.

Referring momentarily back to FIG. 2, if at processing block 214 the system determines that there is no winning outcome for the secondary bet, then the flow 200 ends. However, if the system determines that there is a winning outcome for the secondary bet, then the system can, at processing block 216, determine whether there is authorization to access session funds for the wagering game content. The operations associated with processing block 216 can be similar to those described for processing block 206. If the system determines, at processing block 216, that there is authorization to access session funds for the wagering game content, then, at processing block 218, the system provides a secondary bet win amount to the gaming session for the primary game content. However, if, at processing block 216, the system determines that there is no authorization to access session funds for the wagering game content, then, at processing block 220, the system provides the secondary bet win amount to the player account.

Figure 8:
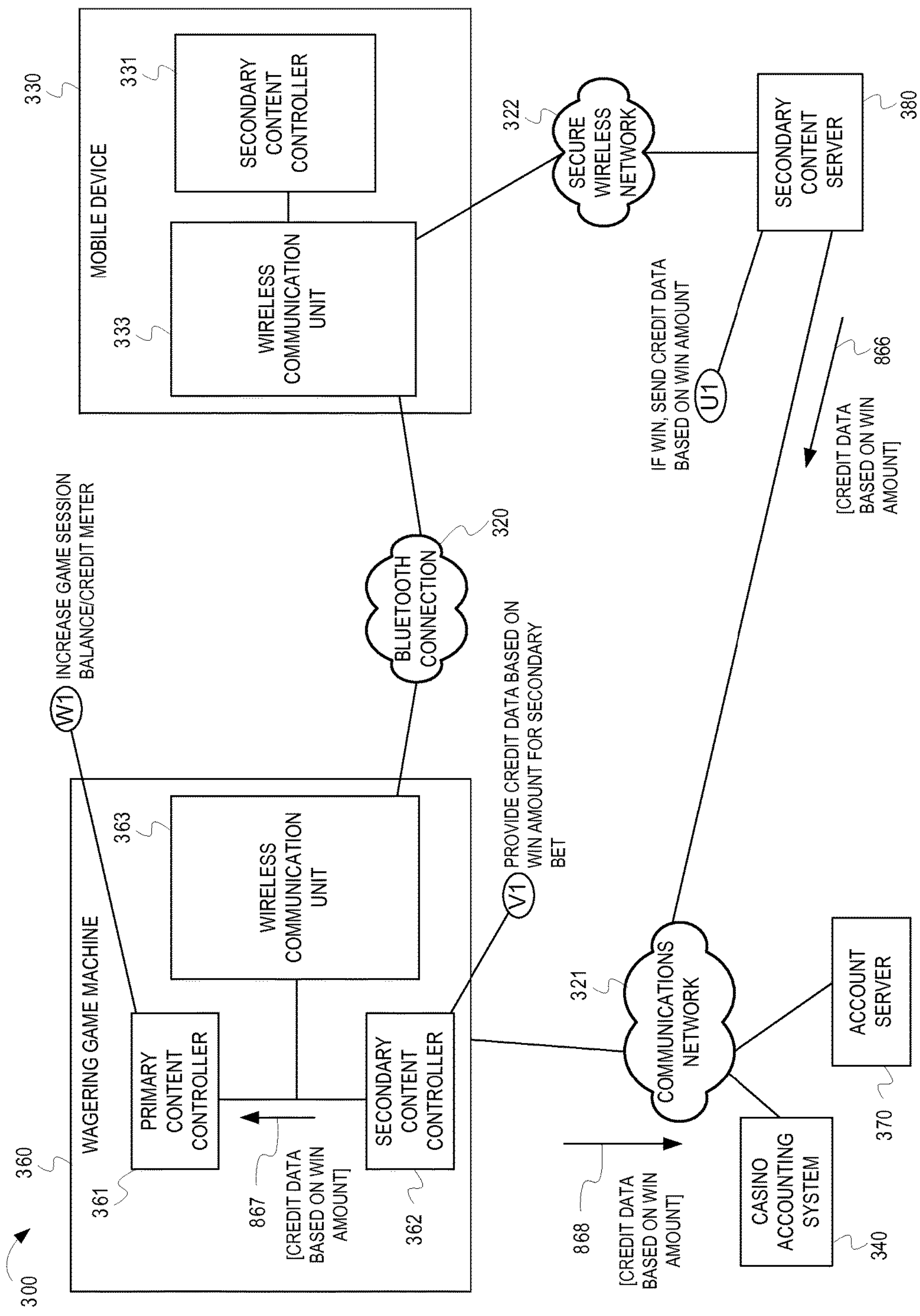
Figure 9:
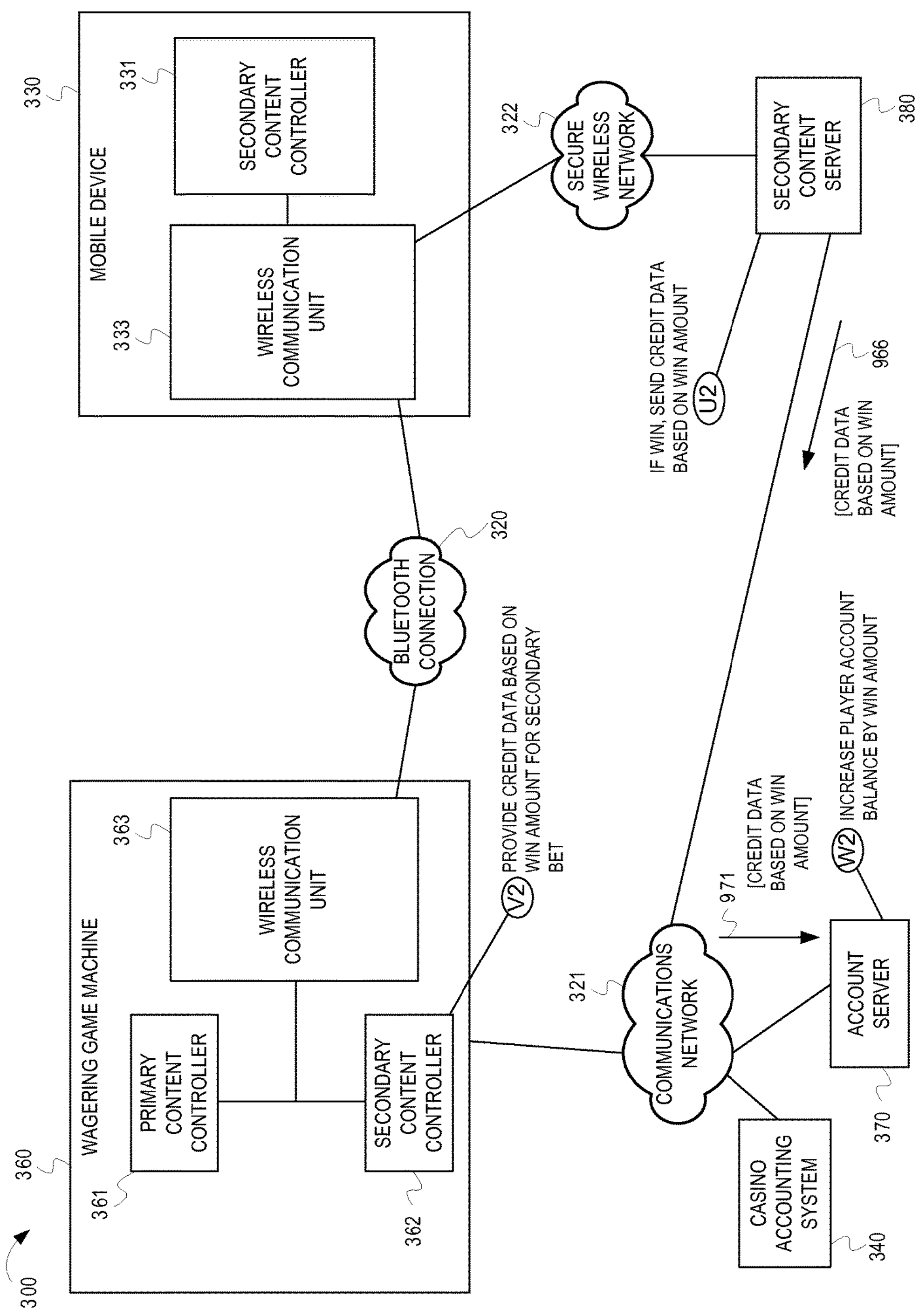

FIGS. 8 and 9 illustrate two different ways of providing a win amount of the secondary bet to a respective source of the funds used to place the secondary bet. The first way, shown in FIG. 8, illustrates an example of adding funds to the gaming session of the wagering game machine 360. FIG. 8 is pertinent to processing block 218. The second way, shown in FIG. 9, illustrates an example of adding funds to a player account. FIG. 9 is pertinent to processing block 220.

Referring first to the example of FIG. 8, at stage "U1," the secondary content server 380 sends to the secondary content controller 362 credit data 866 that indicates an amount of the win for the secondary bet. At stage "V1," the secondary content controller 362 provides first credit data 867 to the primary content controller 361. The secondary content controller 362 also provides second credit data 868 to the casino accounting system 340. The secondary content controller 362 can send a first SAS command, having the first credit data 867, to the primary content controller 361. The first SAS command may initiate a first AFT with the primary content controller 361, which, to the primary content controller 361, appears as an AFT initiated from the casino accounting system 340. At stage "W1," the primary content controller 361 receives the first credit data 867 (e.g., as a SAS command to initiate the first AFT), which causes credits (in the amount of the win for the secondary bet) to be placed onto the credit meter for the primary game content. Further, referring again to stage "V1," the secondary content controller 362 can send a second SAS command, having the second credit data 868, which indicates to the casino accounting system 340 that an amount of money was deposited into the wagering game machine 360, as if an amount of funds (equivalent to the win amount for the secondary bet) were deposited via a ticket input mechanism, or other monetary input mechanism, of the wagering game machine 360. Thus, in some embodiments, the secondary content controller 362 functions as a proxy between the primary content controller 361 and the casino accounting system 340 to ensure that financial data is properly accounted. Thus, the secondary content controller 362 can divert and/or add funds to/from the primary content controller 361 regarding independent game sessions and/or different game devices (from different game providers), yet still send appropriate SAS communications to the casino accounting system 340 to satisfy accounting rules required for funds transfers.

In FIG. 9, at stage "U2," the secondary content server 380 sends data 966. The data 966 includes credit data related to the win amount. In other words, the data 966 specifies the win amount for the secondary bet.

At stage "V2," the secondary content controller 362 receives the data 966 and sends data 971 to the account server 370. In other embodiments, the secondary content server 380 can instead send the data 966 directly to the account server 370 without intervention by the secondary content controller 362. In such an instance, the secondary content controller 362 may detect that the data 966 was sent to the account server 370 (e.g., the secondary content controller 362 can sniff a SAS communication sent by the secondary content server 380 to the account server 370).

At stage "W2," the account server 370 receives the data 971 and increases a credit balance for the player account by the win amount for the secondary bet.

While FIGS. 3-9 illustrated some examples where the secondary content server 380 and the secondary content controller 362 are directly connected via the communications network 321. In other embodiments, however, a secondary content controller may not be directly connected to a secondary content server via a communications network. Instead, in some embodiments, the secondary content controller can be directed to a secondary content server using the mobile device. For example, the secondary content controller can first send communications related to the primary wagering game content (e.g., communications related to credits, primary game events, etc.) to the mobile device via a first wireless connection (such as via the Bluetooth connection 320 shown in FIGS. 4-9). The mobile device can be connected to the secondary content server via a second wireless connection (such as via the secure wireless network 322 shown in FIGS. 4-9). The mobile device can then forward the communications received from the secondary content controller to the secondary content server using the second wireless connection.

Figure 10:
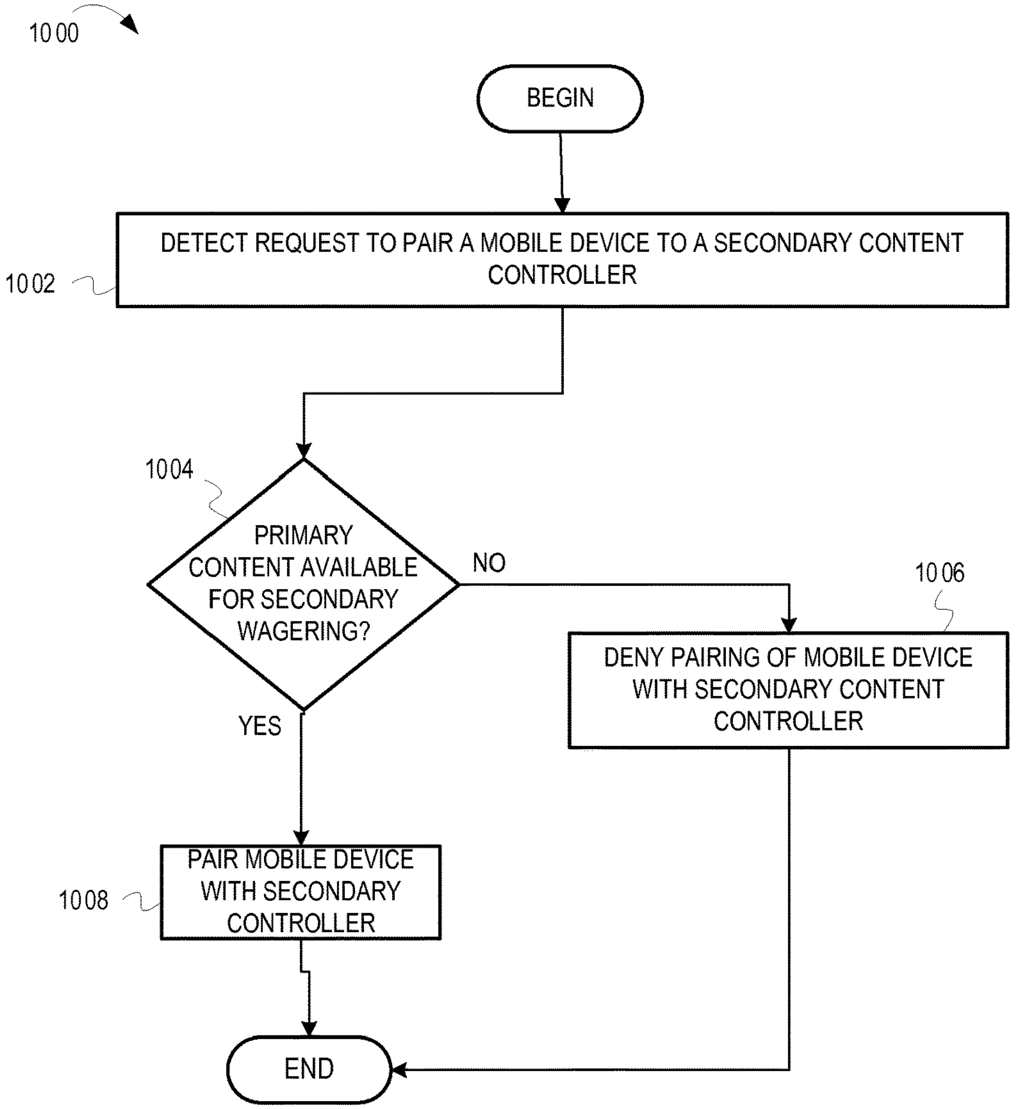
FIG. 10 is a flow diagram illustrating controlling authorization to pair a mobile device with a secondary content controller, according to some embodiments.

FIG. 10 is a flow diagram ("flow") 1000 illustrating controlling authorization to pair a mobile device with a secondary content controller, according to some embodiments;

In FIG. 10, the flow 1000 begins at processing block 1002, where a secondary content controller detects a request by a mobile device to pair with the secondary content controller. The secondary content controller is communicatively coupled to a wagering game machine. For instance, the secondary content controller may be incorporated into the wagering game machine (e.g., plugged into an expansion slot on a motherboard of the wagering game machine 1160). In other embodiments, the secondary content controller is external to the wagering game machine and is communicatively coupled to the wagering game machine via a communications connection (e.g., plugged into an Ethernet port of the wagering game machine, connected wirelessly to a wagering game machine, etc.). The secondary content controller may be independent from the wagering game machine (e.g., provided by a content provider and/or manufacturer that is different from a game provider and/or manufacturer that provided the wagering game machine). For instance, the secondary content controller may be configured to provide additional content that runs independent from primary wagering game content on the wagering game machine. The secondary content controller, however, interacts with the wagering game machine. Therefore the secondary content controller is coupled communicatively (i.e., coupled so that the secondary content controller can communicate with, and/or receive communications from, a primary content controller of the wagering game machine). The secondary content controller may be inconspicuously positioned (e.g., in a cabinet of the wagering game machine, on top of the wagering game machine, behind the wagering game machine, etc.) so that a player does not see the secondary content controller.

The secondary content controller can include a wireless beacon that detects when the mobile device is within a given distance (i.e., proximity range). The mobile device also includes a wireless beacon which can cause a pairing item to appear on the mobile device as a representation of the wagering game machine even though the wireless beacon is actually associated with the secondary content controller. If the pairing item is selected from the mobile device, the mobile device can send a request to the secondary content controller to pair, such as via the Bluetooth pairing procedure described previously in FIG. 4.

The flow 1000 continues at processing block 1004, where the secondary content controller determines whether primary wagering game content on the wagering game machine is available for secondary wagering. For example, the secondary content controller can determine that primary wagering game content of the wagering game machine is in a state that would permit secondary wagering by determining that the wagering game machine has been activated for game play. When the wagering game machine is activated for play, the primary wagering game content is presented and wagers can be made. For example, the secondary content controller can determine that a credit meter of the primary wagering game content is funded. A player may insert or scan a ticket or card using an electronic scanning device of the wagering game machine. The ticket or card is encoded with electronic funds, such as credits. The wagering game machine reads the ticket or card and transfers the electronic funds to an account associated with the wagering game session ("gaming session account"). The gaming session account stores funds temporarily on the wagering game machine to be used for funding wagers on the primary wagering game content. A credit meter associated with the primary wagering game shows the funds.

In some examples, the gaming session account is anonymous. In other examples, the gaming session account is associated with a player account. For instance, instead of scanning a ticket or card that is encoded with funds, a player may instead scan a player card or player device (e.g., RFID device) that is encoded with identifying information for the player and/or an identifier for an account-based-wagering (ABW) player account. The electronic scanning device can read the identifying information and log into the player account via the wagering game machine. In some examples, the system can transfer funds from the player to the gaming session account. In some examples, the player account may not include funds. However, the gaming session may still be activated after the player account logs in. After logging into the player account, the player account can present an option to transfer funds from a financial account (e.g., via electronic funds transfer from a bank account or a credit card) to the player account and/or to the gaming session account. Therefore, in some embodiments, the secondary content controller determines that primary wagering game content of the wagering game machine is in a state that would permit secondary wagering by determining that a player account has logged into the wagering game machine using a player account.

In some examples, the secondary content controller also determines that primary wagering game content of the wagering game machine is in a state that would permit secondary wagering by determining that the primary wagering game content is in non-active, game-play state. A non-active, game play state is a state where a primary wagering game application is not actively presenting a game-play round for the primary wagering game (e.g. is not actively presenting a spin of slot reels, is not actively computing a random-number and/or a random wagering game outcome, is not actively presenting a congratulatory effect for a win event of the primary wagering game, etc.). More specifically, a primary wagering game may experiencing certain events. One type of event is an idle event, where the primary wagering game is not doing anything. A second type of event is a game-start event, which may occur when a "spin" button or "bet" button is activated on a wagering game machine. The game-start event initiates a betting transaction and begins a game play rounds for the primary wagering game. After the game-start event, the primary game may deactivate betting controls for the primary game until after a game-end event occurs. After the game-start event, the primary wagering game may also generate a random game outcome or detect a randomly generated game outcome for the game play round. After the game-start event, the primary wagering game may also present active movement or activity of the primary wagering game elements (e.g., present spinning reels, present a card deal, present movement of a game character, etc.). Further, after the game-start event and after determining the game outcome, the primary wagering game presents a reveal of the game outcome. For example, if the game outcome is a win, the primary wagering game may present a congratulatory game effect. In some examples, after the game-start event, the primary wagering game may also determine whether to present a bonus game and/or bonus content (e.g. present episodic content, launch a community game, present a progressive game event, etc.). At some point after the game-start event, depending on the configuration of the primary wagering game and/or jurisdictional rules, the primary wagering game generates a game-end event, which indicates the end of the game play round. In some examples, the game-end event may occur immediately after the reveal of the game outcome. In other examples, the game-end event may occur after the reveal of the game outcome and after a congratulatory game effect is presented and/or after bonus content is presented. After the game-end event occurs, the primary wagering game activates the betting controls again so that a second bet can be made and a subsequent game play round can begin.

The secondary content controller can detect the game-start events and game-end events. Therefore, in some embodiments, the secondary content controller can determine that the primary wagering game content is in a state that would permit secondary wagering by determining whether the primary wagering game content has generated a game-start event in relation to a game-end event. For instance, if the secondary content controller detects, at a beginning of a gaming session (i.e., after a log-in event, after a gaming session funding event, etc.), that a game-start event has not been generated, then the primary wagering game is in a state that would permit wagering. In another example, if the secondary content controller detects, during a gaming session, that a game-end event has occurred and has not yet been sequentially followed by game-start event, then then the primary wagering game is in a state that would permit wagering. However, if the secondary content controller detects that a game-start event has occurred, but has not yet been followed sequentially by a game-end event, then the primary wagering game is in a state that would not permit wagering If, at processing block 1004, the secondary content controller determines that the primary wagering game content is not available, the flow 1000 continues at processing block 1006, where the secondary content controller denies pairing of the mobile device with the secondary content controller. For example, the secondary content controller can send a message to the mobile device that the pairing is unavailable. In some example, the secondary content controller may momentarily turn off the pairing functionality.

However, if, at processing block 1004, the secondary content controller determines that the primary wagering game content is available, the flow 1000 continues at processing block 1008, where the secondary content controller pairs with the mobile device.

Figure 11:
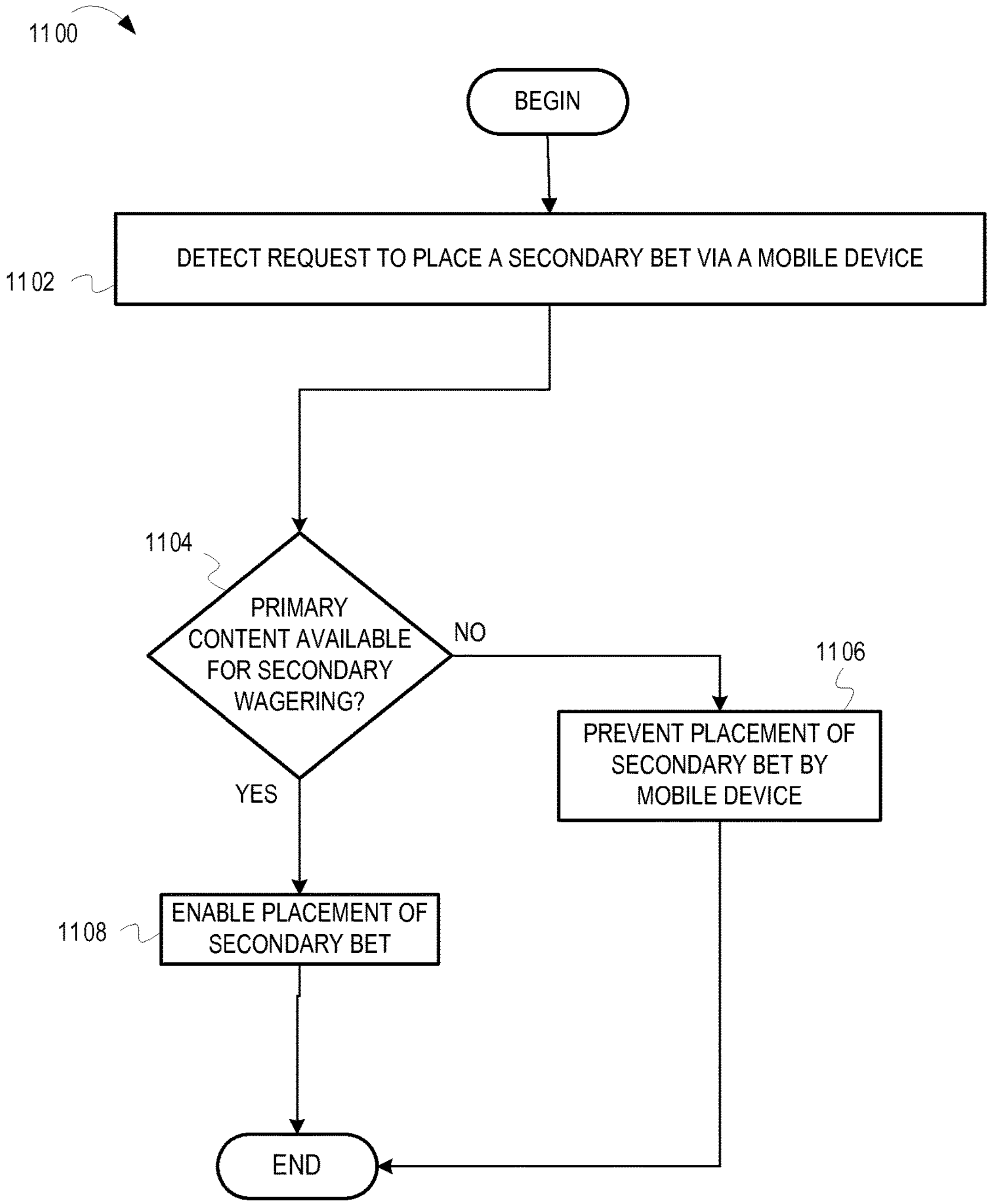
FIG. 11 is a flow diagram illustrating controlling authorization to perform secondary betting via a mobile device paired with a secondary content controller, according to some embodiments.

FIG. 11 is a flow diagram ("flow") 1100 illustrating controlling authorization to perform secondary betting via a mobile device paired with a secondary content controller, according to some embodiments.

The flow 1100 starts at processing block 1102, where the secondary content controller detects a request to place a secondary bet via a mobile device. For example, the secondary content controller may detect that a paired mobile device presents an application which presents betting options to place secondary bets on potential primary game events.

The flow 1100 continues at processing block 1104, where the secondary content controller determines whether the primary wagering game content is available for secondary wagering. For example, the secondary content controller can determine whether the primary wagering game is in a non-active, game-play state (e.g., if the primary wagering game is not actively presenting a game-play round for the primary wagering game). Several examples of determining whether a primary wagering game is in a non-active, game-play state were specified previously for processing block 1004 of FIG. 10.

Still referring to FIG. 11, if, at processing block 1104, the secondary content controller determines that the primary content is not available for secondary wagering, the flow 1100 continues at processing block 1106, where the secondary content controller prevents placement of a secondary bet via the mobile device. For example, the secondary content presented on the mobile device includes betting options to bet on potential events that may occur during an active, game-play state of the primary wagering game. Therefore, if the primary wagering game is in an active game state, and if the mobile device were allowed to place bets on the primary wagering game, then several possible conflicts could arise. For instance, a conflict may arise in the timing of the placement of the secondary bet, which can lead to conflicts in payments of wagers and/or confusion about whether the secondary bet referred to a current game play or a subsequent game play. For example, if the secondary bet were permitted to be placed when a primary game playing round had already begun, a player may think that the secondary bet should apply to the current betting round. Supposing, for the sake of this example, that the current betting round were to result in a winning event, and supposing that instead of placing the secondary bet on the betting round (that had the winning event), the mobile device placed the secondary bet on a subsequent betting round (which had yet to be played), the player would possibly feel confused about why the secondary bet did not result in a win. Furthermore, if a secondary bet were allowed to be placed during a playing round of the primary game, then a player could see a portion of a reveal of the wagering game outcome and then place a secondary bet that took advantage of the partially revealed outcome. For example, in a five reel slot game, if one of the potential betting options for the secondary content was a proposition bet that multiple types of symbols would occur in a payline, and if one or more of the types of symbols appeared in a potential payline row when two of the reels stopped spinning, then before the last three reels stopped spinning, a player could select the one of the potential betting options. Thus, the player could increase their odds of winning, resulting in an unfair advantage.

Consequently, according to some embodiments, the secondary content controller can ensure that no secondary bets are placed on the mobile device by determining game-play state of the primary wagering game and preventing the mobile device from placing secondary wagers if the primary wagering game is in an active, game-play state. For example, the secondary content controller can send a message to the mobile device to disable betting options as soon as it detects a game-start event. In other examples, the mobile device may disable betting options by default. In that case, the secondary content controller would instead send a message to the mobile device to enable secondary betting only if the secondary content controller detects that a game-end event has occurred and has not yet been followed sequentially by a game-start event.

Referring back to processing block 1104, if the secondary content controller determines that the primary wagering game content is available for secondary wagering, the flow 1100 continues at processing block 1108, where the secondary content controller enables the placement of the secondary bet via the mobile device. For example, the secondary content controller may send a message to the mobile device to enable betting options on the mobile device to place the secondary bet.

In some embodiments, the secondary content controller can determine whether the primary wagering game is a current game-play state that could result in some of the potential game events presented on betting options of the secondary game content, yet still enable secondary betting for other betting options that apply to primary game events that would not occur during the current game-play state. For example, one of the betting control options of the mobile device may be for placing a secondary bet on what might happen in the primary wagering game between certain time periods that will occur subsequent to a current time (e.g., in a minute from now). Therefore, the current, active, game-play state would not be relevant to that betting option. As such, the secondary content controller may permit that betting option to occur, while preventing other betting options on potential primary game events that might occur from the current, active, game-play state.

Further, while the secondary content controller prevents secondary wagering on a primary wagering game, the secondary content controller may enable secondary betting on one or more independent secondary games presented on the wagering game machine, even while the primary wagering game is in an active, game-play state for the primary wagering game.

Additional Example Embodiments

According to some embodiments, a wagering game system ("system") can provide various example devices, operations, etc., to providing secondary betting via an associated mobile device. The following non-exhaustive list enumerates some possible embodiments.

Multiple Mobile Devices Paired with the Same Wagering Game Machine.

In some embodiments, the system is configured to pair multiple mobile devices with the same wagering game machine. Thus, different users can bet on different events that occur on the same wagering game machine. In some embodiments, a wagering game machine can provide multiple visual indicators when pairing with multiple mobile devices. For example, the wagering game machine can have multiple overhead visual indicators that flash different colors for different mobile devices that are paired. For instance, a red lighting effect on the wagering game machine's overhead display pertains to a first player's mobile device, whereas a green lighting effect pertains to a second player's mobile device. If more than one wagering game machine in the wireless pairing range, the mobile device's apps could present additional indicia, such as descriptions of game themes for the different wagering game machines, orientation indicators, etc. In some embodiments, if the first player at the wagering game machine is indicated as a social contact of the second player, and if the first player has authorized it, the mobile app for the second player could show information about first player. For example, the mobile app for the second player could show an image of the first player, could indicate which wagering game machine the first player is at, could show win streak data associated with the first player, could show accomplishments by the first player in the gaming session, etc. In some embodiments, the wagering game machine could show credit meter data to the second player if the second player has sufficient authority, such as "spouse" level authority.

Secondary Betting without Pairing.

In some embodiments, the mobile device does not pair with the wagering game machine. Rather, a user can launch an app on a mobile device that will show a listing of wagering game machines on a casino floor. Any one, or more, of the wagering game machines may be selected via the app. One or more secondary bets can be placed for each of the wagering game machines selected via the app. Secondary content controllers for each of the wagering game machines can detect primary content events and provide event data for each of the secondary bets.

Secondary Betting on Progressives.

In some embodiments, the system can pair a mobile device with a wagering game machine and make a secondary game bet related to a progressive game. The secondary bet specifies that if a progressive jackpot were to be won on the wagering game machine within a certain number of game play rounds, then the user that made the secondary bet would get a portion of a reset value of the progressive game. For example, a reset value for a jackpot amount of the progressive game may be five thousand dollars ($5K). The progressive jackpot may increase over time to more than the reset value (e.g., to $1 million) until a player wins the jackpot. The wagering game machine associated with the secondary bet is eligible for the progressive jackpot. An event that occurs on the wagering game machine causes the player to win the progressive jackpot amount (e.g., the player wins the $1 million). Because the user of the mobile device made the secondary bet that the progressive jackpot would be won by the wagering game machine, the user of the mobile device wins some, or all, of the reset value for the progressive jackpot (e.g., $5K). In other examples, the system can provide a secondary bet where a user of a mobile device can place a secondary bet to attempt to win an amount shown a the progressive meter at the time of the secondary game bet.

Secondary Content Controller as Secondary Host.

In some embodiments, the secondary content controller is configured to be a proxy accounting host that intercepts communications between a primary content controller and a casino accounting system. However, in other examples, the secondary content controller can be configured as a secondary host, in additional to the casino accounting system. In this scenario, the primary content controller can work with both the casino accounting system and with the secondary content controller. Further, in some embodiments described previously, the secondary content controller sniffs primary game events that are sent from the primary content controller to a second device different from the secondary content controller. For example, if there is a limit to the number of hosts that can be subscribed to a primary content controller (e.g., as in SAS), and if other hosts are already subscribed to the primary content controller (e.g., a casino accounting system and a progressive game server), the secondary content controller may not be able to connect as a host. In such a scenario, the secondary content controller may instead sniff data communications between the primary content controller and other hosts. However, in other embodiments, the secondary content controller can be configured as a secondary recipient of game event data and does not have to sniff data. For example, if the limit to the number of hosts is not reached for SAS then the secondary content controller can be subscribed as a valid host. In another example, if another protocol is used, such as the Game to System (G2S) protocol, which provides for a vast number of hosts, then the secondary content controller can be subscribed as a valid host. Thus, the secondary content controller can be subscribed to primary game events. Therefore, in such an example, the primary content controller can send the primary game events directly to the secondary content controller as well as to any other hosts that are subscribed to receive the primary game events.

Controlling Secondary Bet Based on Termination Event.

In some embodiments, a termination event may occur before a condition for a secondary bet is satisfied. For example, a mobile device may be linked with a secondary content server. A proposition bet may be made, via the mobile device, that a specific primary wagering game event will occur via a wagering game within a certain number of game plays (e.g., that four specific symbols will occur in a payline within the next 10 spins). In some examples, before the number of game plays have occurred, a termination event may occur that interrupts the conditions associated with the secondary bet. For instance, the mobile device may leave the wireless range of the secondary content controller and may un-pair with the secondary content server before the number of game plays have occurred. In another example, the player that is playing on the wagering game machine may end the wagering game session (e.g., run out of game funds, cash out of the wagering game machine, log off the wagering game machine, etc.) before the number of game plays occur.

In the scenario where the mobile device un-pairs before the conditions of the secondary bet can be satisfied, the system can perform different operations depending on whether the secondary content controller is directly connected to the secondary content server via a back-end communications network, or, instead, whether the mobile device functions as the conduit for communications between the secondary content controller and the secondary content server. In the case where the secondary content controller is directly connected to the secondary content server via a communications network, then, after the mobile device un-pairs, the secondary content server can query the secondary content controller (via the communications network) to determine whether the primary wagering game content is still available (e.g., if there is still money on a credit meter for the primary wagering game and/or if a player account is still logged on to the wagering game machine). If so, then the secondary content controller can communicate game event data directly to the secondary content server via the communications network. The secondary content server can monitor the game events of the primary wagering game until the conditions for the secondary bet have been satisfied (e.g., until the number of game plays have occurred). The secondary content controller can then resolve the secondary bet (e.g., a win or loss based on whether or not there was a win event on the primary wagering game during the number of game plays). The secondary content server can then communicate the results of the secondary bet to the mobile device via a mobile network (e.g., by sending a data communication via a telecommunications network to which the mobile device is connected).

However, after the mobile device un-pairs, if the primary wagering game content is not available (e.g., if funds run out on the credit meter for the primary wagering game before the number of game plays occur and/or if a player account logs off the wagering game machine before the number of game plays occur), the secondary content server can perform a couple of different options.

First, it can cancel the secondary bet, and refund the wagered amounts for the secondary bet. For instance, the secondary content controller can send a coupon for a free game play to an electronic contact identifier (e.g., email, mobile telephone number). In another example, the secondary content controller can transfer the wagered amounts for the secondary bet to a player account associated with the mobile device.

Second, the secondary content server can transfer the secondary bet to a second wagering game machine. For instance, the secondary content server can cause an option to be presented on the mobile device to cancel or transfer bet. If the transfer option is selected, then the secondary content server gives a certain amount of time for the mobile device to pair again with a different wagering game machine that has the same potential event in the condition for the secondary bet. If the mobile device does not pair within the time frame, or if it pairs with a second wagering game machine that does not have the same potential event, then the secondary content server can cancel the secondary bet or extend the time frame. To facilitate the transfer of the secondary bet, the secondary content server can provide, for presentation via the mobile device, a list of other wagering game machines with the same potential event specified by the conditions of the secondary bet (e.g., provide a list of game themes, provide a map to the other wagering game machines, etc.).

The scenarios in the above paragraph indicated some examples of where a mobile device un-pairs before the conditions of the secondary bet can be satisfied and where the secondary content controller is directly connected to the secondary content server via a back-end communications network. In other examples, where a mobile device un-pairs before the conditions of the secondary bet are satisfied and where the secondary content controller is not connected to secondary content server via a back-end communications network (i.e., if the mobile device was functioning as a conduit for communications between the secondary content controller and the secondary content server), then the secondary content server can perform other operations. For instance, the secondary server would not be able to monitor primary game events from the previous wagering game machine from which the mobile device was unpaired. Therefore, the secondary content server can either cancel the bet and refund the bet amount or the secondary content server can offer to transfer the secondary bet (as described in the paragraph above).

In other examples, the secondary content server can cancel a bet and partially refund some of the bet amount. For example, if the conditions of the secondary bet specified that 10 game plays must occur in the primary wagering game, and a termination event occur after only 9 game plays have occurred, the secondary content server can refund 1/10 of the bet amount for the secondary bet. In other examples, such as where the bet amount may not be divisible, the secondary content server can cancel the bet and not refund the game amount, but instead provide another form of compensation, such as a coupon, a discount, a promotional offer, etc., for other gaming or non-gaming activity (e.g., a specific number of free spins for a specific wagering game, a discount on a buffet or other casino merchandise or service, a multiplier for the next time a bonus game occurs, an entry in a raffle drawing, a voucher for a certain number of non-cash points for game play of a non-cash wagering game, a free app, etc.).

In examples where the termination event is that the primary game content becomes no longer available for game play (e.g., the mobile device remains paired, but a player of the wagering game runs out of game funds, cashes out, logs off, or otherwise ends a gaming session for the primary wagering game content), the secondary content server can either cancel the secondary bet or transfer the secondary bet.

Example Operating Environments

This section describes additional example operating environments, systems, networks, etc. and presents structural aspects of some embodiments.

Wagering Game System Architecture

Figure 12:
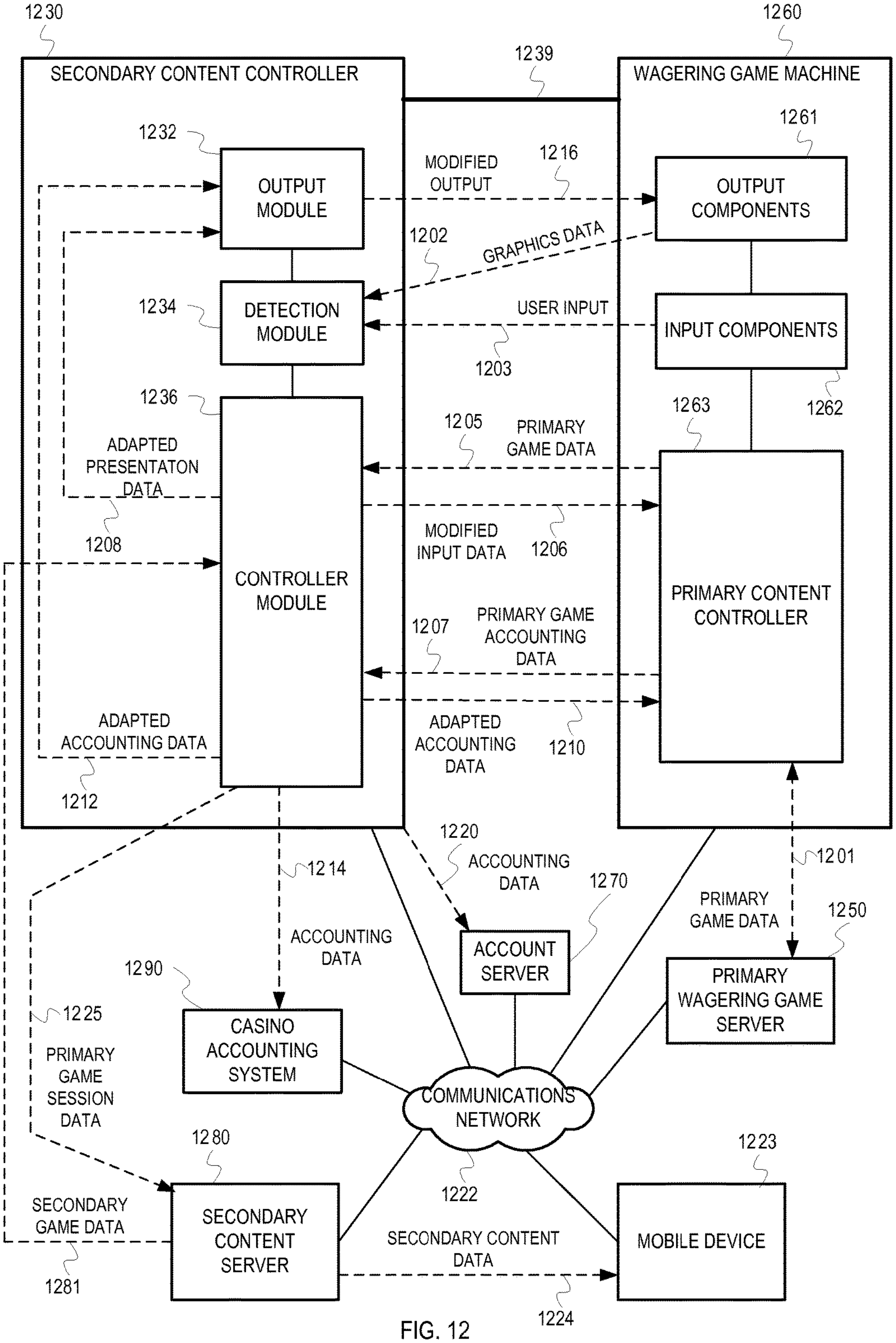
FIG. 12 is an illustration of a wagering game system architecture 1200, according to some embodiments.

FIG. 12 is a conceptual diagram that illustrates an example of a wagering game system architecture 1200, according to some embodiments. The wagering game system architecture 1200 includes a wagering game machine 1260 similar to the wagering game machine 160 described in FIG. 1. The wagering game machine 1260 is configured to present and control wagering games as well as other content associated with the wagering games. For example, the wagering game machine 1260 may be configured to present a primary wagering game. The wagering game machine 1260 includes a primary content controller 1263 configured to manage and control content and presentation of content on the wagering game machine 1260. The wagering game machine 1260 also includes a memory configured to contain content to present on the wagering game machine 1260. The memory can include primary game content for presentation of a primary wagering game on the wagering game machine 1260. The memory can also include secondary game content for presentation of a secondary wagering game on the wagering game machine 1260. The wagering game machine 1260 can also include a Slot Accounting System (SAS) module configured to communicate with one or more elements of the wagering game system architecture 1200 regarding one or more financial transactions, game events, etc., that use the SAS protocol. The wagering game machine 1260 further includes one or more output related components and devices ("output components 1261") configured to control and/or present output information related to the wagering games and the other content. For example, the wagering game machine 1260 includes one or more display devices that present wagering game content for the wagering games, content for casino services, content for advertisements, and so forth. The output components 1261 further include video and graphics devices or engines that generate an image of content to present via the one or more displays associated with the wagering game machine 1260. In another example, the output components 1261 includes speakers, sound cards, etc. that generate and/or present signals and sounds for the wagering games and other content. In another example, the output components 1261 include one or more payout mechanisms, such as a printer that prints out tickets, coupons, etc. related to the wagering games. For example, the printer can print out a ticket that shows a cash-out amount for one or more wagering games concurrently presented via the wagering game machine 1260. In yet another example, the wagering game machine 1260 includes various lighting devices that show information related to wagering games, such as lighting effects (e.g., a celebratory effect, an attract effect, a visual indicator for a pairing procedure, etc.).

The wagering game machine 1260 also includes one or more input related components and devices ("input components 1262") configured to control and/or provide input for the wagering games and other content presented via the wagering game machine 1260. For example, the input components 1262 include a touch-screen display by which a user can touch a screen and select certain virtual controls, objects, items, etc. presented on the touch-screen display. In another example, the input components 1262 include a button panel with buttons related to one or more wagering games, application, services, etc. presented via the wagering game machine 1260. The buttons, for example, may indicate betting amounts, payline amounts, spin controls, or other items used to make bets, spin reels, etc. for a wagering game. The buttons may also detect input related to payout mechanisms and/or cashing out a wagering game, such as an activation of a cash-out button used to transfer credits from wagering game credit balances to a cash-out object, card, ticket, account, etc. The buttons may also accept input related to casino services and amenities. In some examples the input components 1262 also includes input devices related to funds, player information, etc. For example, the wagering game machine 1260 includes an information reader that reads information from a card or device and connects to a player account, a customer loyalty account, a financial account, etc. In some examples, the input components 1262 include eye tracking equipment, biometric devices, and so forth.

The wagering game machine 1260 also includes the primary content controller 1263 configured to control content, such as a primary wagering game or other wagering games, provided from a primary source of wagering game content. The primary content controller 1263 can include software and hardware, such as a processor, memory devices, an operating system, game applications, etc. For example, a primary wagering game server 1250 can provide primary game data 1201 to the primary content controller 1263, such as control and application data for one or more client applications controlled by the primary content controller 1263.

The wagering game system architecture 1200 also includes a secondary content controller 1230 configured to communicate with various components of the wagering game machine 1260 to present and control various aspects of independent secondary content using the output components 1261 and the input components 1262 of the wagering game machine 1260. In some examples, the secondary content controller 1230 is similar to the secondary content controller 162 described in FIG. 1 and/or similar to the secondary content controller 362 described in FIGS. 3-9. For example, the secondary content controller 1230 may be incorporated into the wagering game machine 1260 (e.g., plugged into an expansion slot on a motherboard of the wagering game machine 1260). In other embodiments, the secondary content controller 1230 is external to the wagering game machine 1260 and is connected to the wagering game machine 1260 via a communications connection 1239 (e.g., plugged into an Ethernet port of the wagering game machine 1260, connected wirelessly to a wagering game machine 1260, etc.).

The secondary content controller 1230 includes a detection unit 1234 configured to detect information from the various devices and components of the wagering game machine 1260 including information from the output components 1261 and the input components 1262. For example, the detection module 1234 can detect graphics data 1202 (e.g., graphical and video data) provided from a video card, a graphics engine, or other sources of graphics data of the wagering game machine 1260. The detection module 1234 can send the graphics data 1202 to the controller module 1236. The graphics data 1202 includes a position of primary wagering game content on a display of the wagering game machine 1260 according to default display parameters (e.g., default size of a display area, default display dimensions, etc.). The controller module 1236 can manipulate the graphics data 1202 to move or resize the position of the primary wagering game content relative to the default display parameters. The controller module 1236 can send modified or adapted presentation data 1208 to the output module 1232, such as display coordinates, display boundaries, display sizes, or other display data for the primary wagering game content that has been moved or resized to accommodate the presentation of an independent secondary wagering game. The output module 1232 can receive the adapted presentation data and provide modified output data 1216 to the output components 1261. The output components 1261 can use the modified output data 1216, for example, to move or resize the primary game content on a display device of the wagering game machine 1260. Furthermore, the controller module 1236 can receive secondary game data 1281 from the secondary content server 1280. The controller module 1236 can further include in the adapted presentation data 1208 information about where to position a secondary wagering game relative to the position of the primary game content. The output module 1232 can then incorporate into the modified output data 1216 information about both the secondary game content and the primary game content so that the display device of the wagering game machine 1260 can concurrently present both the primary and secondary game content.

Further, in some embodiments, the detection module 1234 can intercept user input 1203 from the input components 1262 and provide the user input 1203 to the controller module 1236. The controller module 1236 can receive the user input 1203, interpret the user input 1203, and, in some cases, modify the user input 1203 to the adapted presentation data 1208. The controller module 1236 can further provide modified input data 1206 to the primary content controller 1263. For instance, the detection unit 1234 can intercept a touch-screen input from the input components 1262 before the primary content controller 1263 can detect the touch-screen input. The detection unit 1234 can forward the touch-screen input to the controller module 1236. The controller module 1236 can convert or remap the touch-screen input to different coordinates of the touch-screen display that relate to a modified location of primary content on the display as well as to secondary content presented on the display. The controller module 1236 can send the modified input data 1206 to the primary content controller 1263 so that the primary content controller 1263 can control the primary game according to the modified input data 1206. The controller module 1236 can further detect primary game data 1205 generated by the primary content controller 1263 so that the controller module 1236 can generate updates to the adapted presentation data 1208.

The controller module 1236 is further configured to receive information about financial transactions (e.g., from the detection module 1234 via user input 1203 that relates to financial transactions, such as credit transfers, cash outs, etc.). For instance, the controller module 1236 can intercept primary game accounting data 1207, such as SAS messages sent from the primary content controller 1263 directed to the casino accounting system 1290. The controller module 1236 then acts as proxy for the casino accounting system 1290 by generating adapted accounting data 1210, which the controller module 1236 communicates to the primary content controller 1263. Thus, in some embodiments the controller module 1236 interposes itself, or intervenes, between the primary content controller 1263 and the casino accounting system 1290 (e.g., as if the controller module 1236 were an accounting host). For instance, the controller module 1236 initiates a funds transfer between the primary content controller 1263 and the casino accounting system 1290. In some embodiments, the controller module 1236 intercepts the funds transfer from the primary content controller 1263 and provides the funds to the secondary content server 1280 to transact secondary bets. In some embodiments, the secondary content server 1280 can include a SAS module configured to communicate with one or more elements of the wagering game system architecture 1200 regarding one or more types of financial transactions, game events, etc., that use the SAS protocol.

Furthermore, the controller module 1236 can send adapted accounting data 1214 to the casino accounting system 1290. For instance, the controller module 1236 can send accounting data 1214 to the casino accounting system 1290 as if the primary content controller 1263 had initiated a financial transaction. Further, the controller module 1236 can communicate to the casino accounting system 1290 certain SAS communications that satisfy certain accounting rules and requirements associated with the financial transaction.

The wagering game system architecture 1200 can also include an account server 1270 configured to control user related accounts accessible via wagering game networks and social networks. The account server 1270 can store and track player information, such as identifying information (e.g., avatars, screen name, account identification numbers, etc.) or other information like financial account information, social contact information, etc. The account server 1270 can contain accounts for social contacts referenced by the player account. The account server 1270 can also provide auditing capabilities, according to regulatory rules, and track the performance of players, machines, and servers. The account server 1270 can include an account controller configured to control information for a player's account. The account server 1270 can also include an account store configured to store information for a player's account. The account server 1270 can further be configured to provide user information and store information related to a player account and/or a financial account associated with a player (e.g., with a user of the wagering game machine 1260 and/or a user of a mobile device 1223). For example, the controller module 1236 can send accounting data 1220 from the secondary content controller 1230 to the account server 1270. The accounting data 1220 includes information necessary to electronically transfer credits to and/or from the player account and/or financial account associated with the account server 1270.

Referring again to the controller module 1236 of the secondary content controller 1230, in some embodiments, the controller module 1236 sends primary game session data 1225 to the secondary content server 1280. In some embodiments, the primary game session data 1225 includes funding data, such as credits taken from a credit meter of the wagering game machine 1260 and provided to the secondary content server 128 to fund secondary bets. In some embodiments, the primary game session data 1225 includes game event data related to the secondary bet.

The wagering game system architecture 1200 can also include the mobile device 1223. In some examples, the controller module 1236 can communicate with the mobile device 1223, such as via wireless connection. In some embodiments, the secondary content server 1280 can also communicate with the mobile device 1223. For example, the secondary content server 1280 can communicate secondary content data 1224, such as credit data, secondary content, etc.

Each component in the wagering game system architecture 1200 is shown as a separate and distinct element. Some elements may be connected via a communications network 1222 as shown in FIG. 12. In other examples, some, or all, of the components shown may all be contained in one device, or in different devices according to other configurations not shown in FIG. 12. For instance, the secondary content controller 1230 and the casino accounting system 1290 may be incorporated into the wagering game machine 1260 as similarly described in FIG. 1. Furthermore, some functions performed by one component could be performed by other components. For example, the primary wagering game server 1250 can also be configured to perform functions of the wagering game machine 1260, and other network elements and/or system devices. Furthermore, the wagering game system architecture 1200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

The wagering game system architecture 1200 can also include a primary wagering game server 1250 configured to control wagering game content, provide random numbers, and communicate wagering game information, account information, and other information to and from the wagering game machine 1260. The primary wagering game server 1250 can include a content controller configured to manage and control content for presentation on the wagering game machine 1260. For example, the content controller can generate game results (e.g., win/loss values), including win amounts, for games played on the wagering game machine 1260. The content controller can communicate the game results to the wagering game machine 1260. The content controller can also generate random numbers and provide them to the wagering game machine 1260 so that the wagering game machine 1260 can generate game results. The primary wagering game server 1250 can also include a content store configured to contain content to present on the wagering game machine 1260. The primary wagering game server 1250 can also include an account manager configured to control information related to player accounts. For example, the account manager 1253 can communicate wager amounts, game results amounts (e.g., win amounts), bonus game amounts, etc., to the account server 1270. The primary wagering game server 1250 can also include a communication unit configured to communicate information to the wagering game machine 1260 and to communicate with other systems, devices and networks. In some embodiments, the primary wagering game server 1250 can also include a SAS module configured to communicate with one or more elements of the wagering game system architecture 1200 regarding one or more types of financial transactions, game events, etc., that use the SAS protocol.

Each component shown in the wagering game system architecture 1200 is shown as a separate and distinct element connected via a communications network 1222. However, some functions performed by one component could be performed by other components. For example, the primary wagering game server 1250 can also be configured to perform functions of the wagering game machine 1260, and other network elements and/or system devices. In other examples, the secondary content controller 1236 shares or distributes operations with SAS modules of the secondary content server 1280, the casino accounting system 1290, the primary wagering game server 1250, the account server 1270, the wagering game machine 1260, and/or the mobile device 1223. Furthermore, the components shown may all be contained in one device, but some, or all, may be included in, or performed by, multiple devices, as in the configurations shown in FIG. 12 or other configurations not shown. For example, in some embodiments, the wagering game machine 1260 can determine wagering game outcomes, generate random numbers, etc. instead of, or in addition to, the wagering game server 1250.

The wagering game machines described herein (e.g., wagering game machine 1260) can take any suitable form, such as floor standing models, handheld mobile units, bartop models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 1200 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 13:
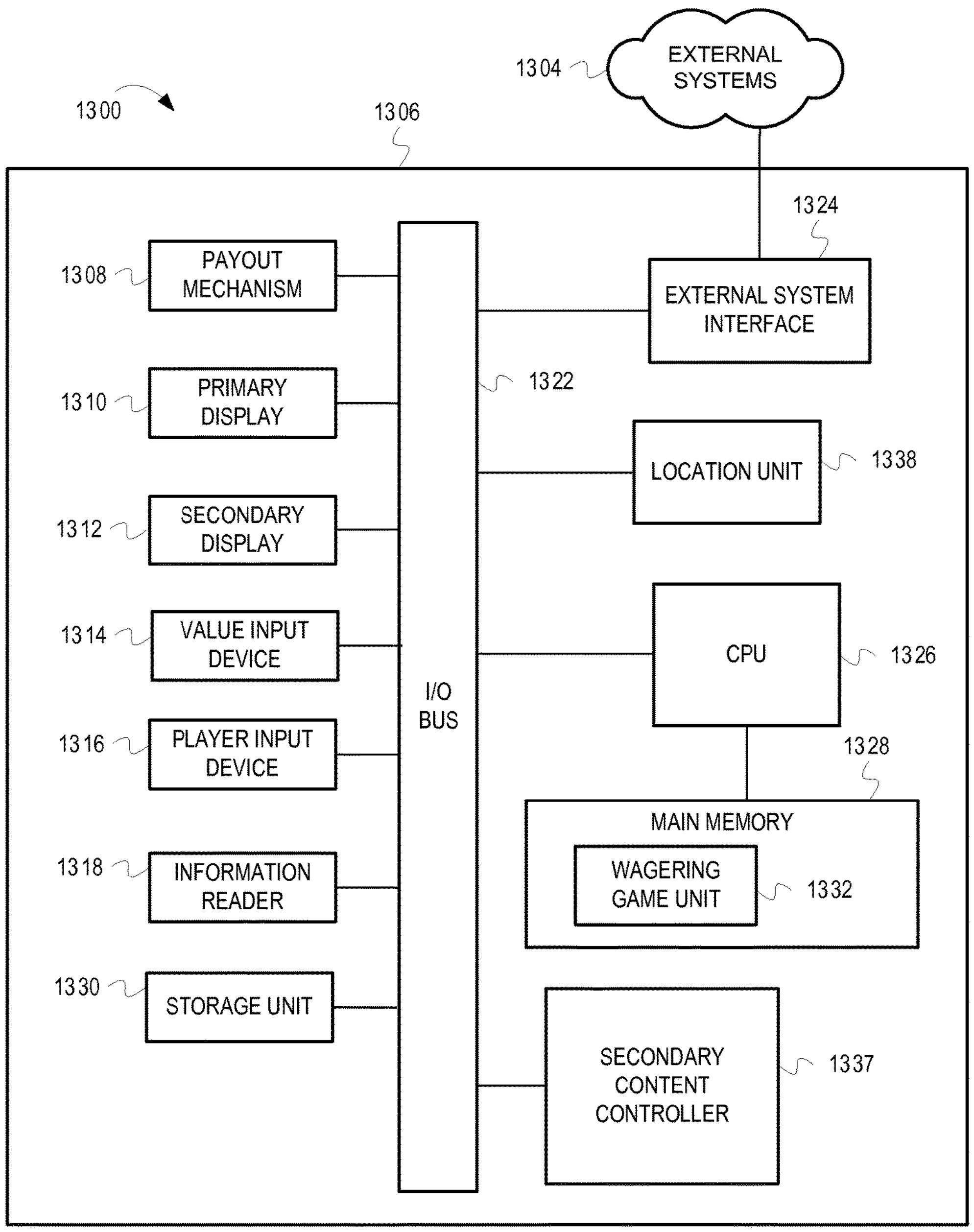
FIG. 13 is an illustration of a wagering game machine architecture 1300, according to some embodiments.

FIG. 13 is a conceptual diagram that illustrates an example of a wagering game machine architecture 1300, according to some embodiments. In FIG. 13, the wagering game machine architecture 1300 includes a wagering game machine 1306, which includes a central processing unit (CPU) 1326 connected to main memory 1328. The CPU 1326 can include any suitable processor, such as an Intel® Pentium processor, Intel® Core 2 Duo processor, AMD Opteron™ processor, or UltraSPARC processor. The main memory 1328 includes a wagering game unit 1332. In some embodiments, the wagering game unit 1332 can present wagering games, such as video poker, video black jack, video slots, video lottery, reel slots, etc., in whole or part.

The CPU 1326 is also connected to an input/output ("I/O") bus 1322, which can include any suitable bus technologies, such as an AGTL+ frontside bus and a PCI backside bus. The I/O bus 1322 is connected to a payout mechanism 1308, primary display 1310, secondary display 1312, value input device 1314, player input device 1316, information reader 1318, and storage unit 1330. The player input device 1316 can include the value input device 1314 to the extent the player input device 1316 is used to place wagers. The I/O bus 1322 is also connected to an external system interface 1324, which is connected to external systems 1304 (e.g., wagering game networks). The external system interface 1324 can include logic for exchanging information over wired and wireless networks (e.g., 802.11g transceiver, Bluetooth transceiver, Ethernet transceiver, etc.)

The I/O bus 1322 is also connected to a location unit 1338. The location unit 1338 can create player information that indicates the wagering game machine's location/movements in a casino. In some embodiments, the location unit 1338 includes a global positioning system (GPS) receiver that can determine the wagering game machine's location using GPS satellites. In other embodiments, the location unit 1338 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 13, in some embodiments, the location unit 1338 is not connected to the I/O bus 1322.

In some embodiments, the wagering game machine 1306 can include additional peripheral devices and/or more than one of each component shown in FIG. 13. For example, in some embodiments, the wagering game machine 1306 can include multiple external system interfaces 1324 and/or multiple CPUs 1326. In some embodiments, any of the components can be integrated or subdivided.

In some embodiments, the wagering game machine 1306 includes a secondary content controller 1337. The secondary content controller 1337 can process communications, commands, or other information, where the processing can provide secondary betting via an associated mobile device.

Furthermore, any component of the wagering game machine 1306 can include hardware, firmware, and/or machine-readable storage media including instructions for performing the operations described herein.

Wagering Game System

Figure 14:
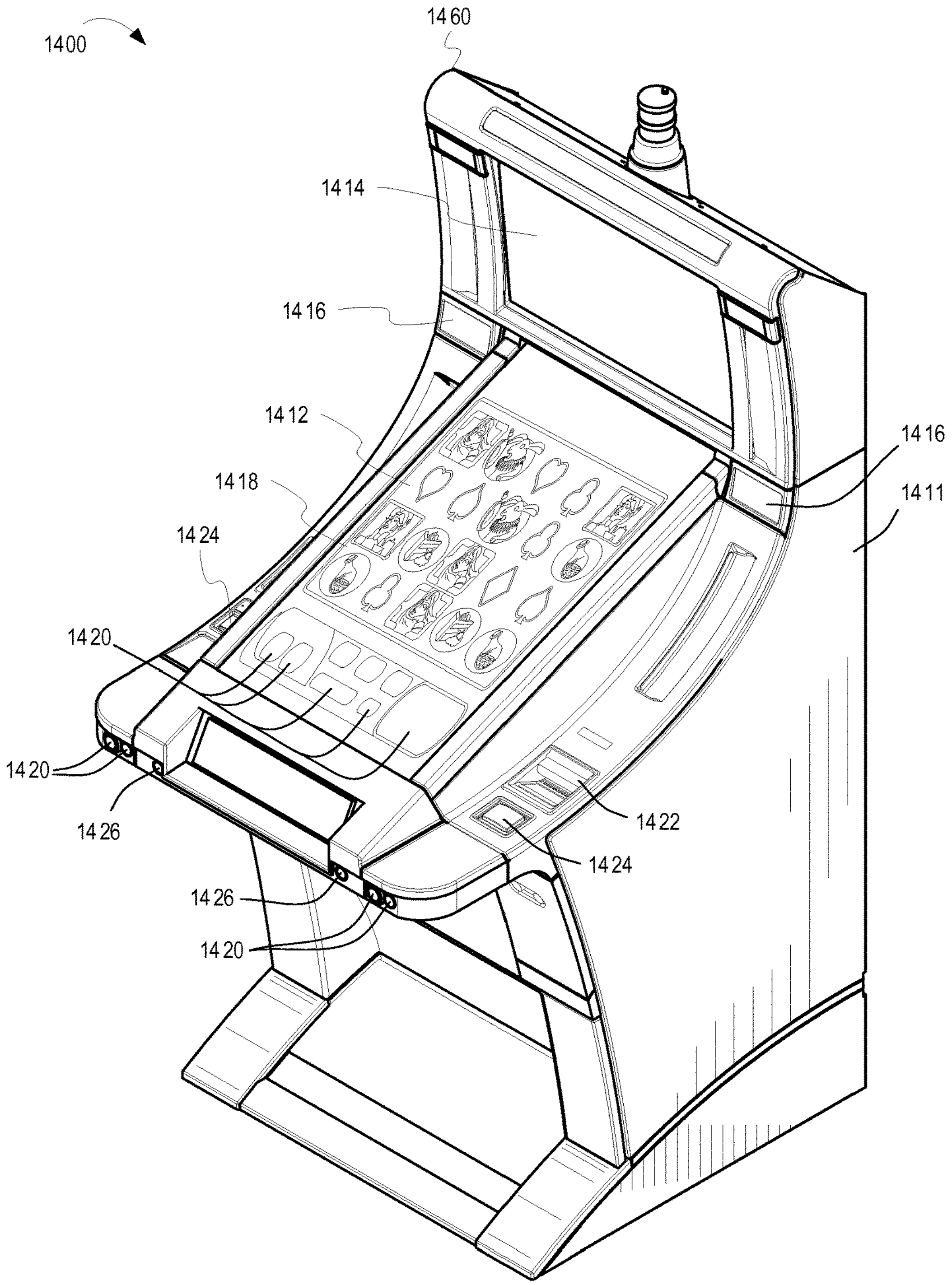
FIG. 14 is an illustration of a wagering game system 1400, according to some embodiments.

FIG. 14 is a conceptual diagram that illustrates an example of a wagering game system 1400, according to some embodiments. In FIG. 14, the wagering game system 1400 includes a wagering game machine 1460 similar to those used in gaming establishments, such as casinos. The wagering game machine 1460 may, in some examples, be referred to as a gaming terminal or an electronic gaming machine. The wagering game machine 1460 may have varying structures and methods of operation. For example, the wagering game machine 1460 may include electromechanical components configured to play mechanical slots. In another example, the 1460 includes electronic components configured to play a video casino game, such as slots, keno, poker, blackjack, roulette, craps, etc. The wagering game machine 1460 is depicted as a floor-standing model. However, other examples of wagering game machines include handheld mobile units, bartop models, workstation-type console models, etc. Further, the wagering game machine 1460 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are each incorporated herein by reference in their entireties.

The wagering game machine 1460 illustrated in FIG. 14 comprises a cabinet 1411 that may house various input devices, output devices, and input/output devices. By way of example, the wagering game machine 1460 includes a primary display area 1412, a secondary display area 1414, and one or more audio speakers 1416. The primary display area 1412 or the secondary display area 1414 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1412 or the secondary display area 1414 includes mechanical reels to display a wagering game outcome. In some example, the primary display area 1412 or the secondary display area 1414 present a transmissive video display disposed in front of a mechanical-reel display to portray a video image superimposed upon the mechanical-reel display. In FIG. 14, the wagering game machine 1460 is a "slant-top" version in which the primary display 1412 is slanted (e.g., at about a thirty-degree angle toward the player of the wagering game machine 1460). Another example of wagering game machine 1460 is an "upright" version in which the primary display 1414 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1460. The wagering game machine 1460 includes a touch screen(s) 1418 mounted over the primary or secondary areas, buttons 1420 on a button panel, bill validator 1422, information reader/writer(s) 1424, and player-accessible port(s) 1426 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 1418, buttons 1420, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a wagering game system, the method comprising:

electronically detecting, via a network communication interface of the wagering game system, a request to pair a mobile device with a secondary content controller that is communicatively coupled to a wagering game machine, wherein the secondary content controller is independent of a primary content controller of the wagering game machine;

determining, by the secondary content controller, that primary wagering game content of the wagering game machine is in a state that would permit secondary wagering on the primary wagering game content; and electronically pairing, via the network communication interface, the mobile device with the secondary content controller after the determining that the primary wagering game content is in the state that would permit the secondary wagering.

2. The method of claim 1, wherein the determining that the primary wagering game content is in the state that would permit the secondary wagering comprises determining that the primary game content is activated for game play.

3. The method of claim 2, wherein the determining that the primary game content is activated for game play comprises determining that a credit meter of the primary wagering game content is funded.

4. The method of claim 2, wherein the determining that the primary game content is activated for game play comprises determining that a wagering game player account is logged in to the wagering game machine.

5. The method of claim 2, wherein the determining that the primary wagering game content is in the state that would permit the secondary wagering comprises determining that the primary wagering game content is in a non-active, game-play state.

6. The method of claim 5, wherein the non-active, game play state of the primary wagering game comprises one or more of an idle state of the wagering game machine, a state after a credit meter is funded and before a game-start event of the primary wagering game, a state after a login event of the wagering game machine and before a game-start event of the primary wagering game, a state when a congratulatory game effect is presented for the primary wagering game, a state when an episodic event is presented for the primary wagering game, or a state when a bonus game is presented.

7. The method of claim 1, further comprising:

after the pairing, providing to the mobile device, by the secondary content controller, authorization to place the secondary wager on the primary wagering game content in response to the determining that the primary wagering game content is in the state that would permit secondary wagering on the primary wagering game content.

8. The method of claim 7, wherein the providing the authorization to place the secondary wager comprises causing an application on the mobile device to enable content to place a wager on a potential occurrence of an event of the primary wagering game content.

9. The method of claim 1, wherein the determining that the primary wagering game content is in a state that would permit secondary wagering on the primary wagering game content comprises:

determining a potential outcome, for the primary wagering game content, on which the secondary wager can be placed; and determining that the primary wagering game content has not initiated a game play round from which the potential outcome may occur.

10. The method of claim 1 further comprising:

determining that the mobile device is authorized to access gaming funds from the wagering game machine; and using funds from the wagering game machine to place the secondary wager.

11. The method of claim 1, wherein the wagering game machine includes a value input device configured to receive monetary input for placement of wagers on one or more casino wagering games.

12. One or more non-transitory, machine-readable storage media having instructions stored thereon which, when executed by a set of one or more processors of a wagering game system, cause the wagering game system to perform operations for controlling a wagering game system, the instructions comprising:

instructions to electronically pair, via a wireless communication interface of the wagering game system, with a mobile device by a secondary content controller communicatively coupled to a wagering game machine, wherein the secondary content controller is independent of a primary content controller of the wagering game machine;

instructions to determine, by the secondary content controller, after the pairing, that a primary wagering game is not in an active game-play state during which a potential event could occur; and electronically provide to the mobile device, by the secondary content controller, authorization to place a secondary wager on the potential event of the primary wagering game in response to the determination that the primary wagering game is not in the active game-play state.

13. The one or more non-transitory, machine-readable storage media of claim 12, wherein the instructions to provide to the mobile device the authorization to place the secondary wager include one or more instructions comprising instructions to send to the mobile device a command in response to the determination that the primary wagering game is not in the active game-play state, wherein the command permits selection of the potential event from an application of the mobile device.

14. The one or more non-transitory, machine-readable storage media of claim 13, the instructions further comprising:

instructions to cause the application on the mobile device to launch in response to the pairing, wherein the application provides a user interface configured to present betting controls for the secondary bet, wherein the betting controls specify the potential event.

15. The one or more non-transitory, machine-readable storage media of claim 12, the instructions further comprising:

instructions to establish, during the pairing, a first wireless link between the secondary content controller and the mobile device;

instructions to establish a second wireless link between the mobile device and a secondary content server separate from the secondary content controller; and instructions to communicate data from the secondary content controller to the secondary content server using the first wireless link and the second wireless link, wherein the data is associated with the primary wagering game.

16. The one or more non-transitory, machine-readable storage media of claim 12, the instructions further comprising:

instructions to determine that the mobile device is authorized to access gaming funds from the wagering game machine; and instructions to use funds from a credit meter of the wagering game machine to place the secondary bet.

17. The one or more non-transitory, machine-readable storage media of claim 16, wherein the instructions to use the funds include:

instructions to send a command to the wagering game machine to initiate a funds transfer with an accounting host;

instructions to intercept the funds transfer from the wagering game machine to the accounting host; and instructions to provide, from the funds transfer, the at least the portion of the amount of funds for the secondary bet.

18. The one or more non-transitory, machine-readable storage media of claim 16, the instructions further comprising:

instructions to intercept a communication from the wagering game machine, wherein the communication specifies information about an occurrence of the event; and instructions to provide the information from the wagering game machine to resolve the secondary bet.

19. The one or more non-transitory, machine-readable storage media of claim 16, the instructions further comprising:

instructions to determine that the secondary wager results in a win; and instructions to return a win amount for the secondary wager to the credit meter of the wagering game machine.

20. A wagering game system comprising:

one or more processors;

a network communication interface; and at least one memory storage unit configured to store instructions which, when executed by at least one of the one or more processors, cause the system to perform operations to control the wagering game system, the instructions comprising:

instructions to electronically detect, via the network communication interface, a request to pair a mobile device with a secondary content controller that is communicatively coupled to the wagering game system, wherein the secondary content controller is independent of a primary content controller of the wagering game system, instructions to determine that primary wagering game content of the wagering game system is in a state that would permit secondary wagering on the primary wagering game content, and instructions to electronically pair the mobile device with the secondary content controller in response to the determination that the primary wagering game content is in the state that would permit the secondary wagering.

21. The wagering game system of claim 20, wherein the wagering game system includes a value input device configured to receive monetary input for placement of wagers on one or more casino wagering games.

22. The wagering game system of claim 20, wherein the instructions further include:

instructions to determine that the primary wagering game content is in a non-active, game-play state.

23. The wagering game system of claim 22, wherein the non-active, game play state of the primary wagering game comprises one or more of an idle state of the wagering game system, a state after a credit meter is funded and before a game-start event of the primary wagering game, a state after a login event of the wagering game system and before a game-start event of the primary wagering game, a state when a congratulatory game effect is presented for the primary wagering game, a state when an episodic event is presented for the primary wagering game, or a state when a bonus game is presented for the primary wagering game.

24. The wagering game system of claim 20, wherein the instructions further include instructions to determine that a wagering game credit meter of the primary wagering game content is funded.

25. The wagering game system of claim 20, wherein the instructions further include instructions to determine that a wagering game player account is logged in to the wagering game system.

* * * * *